US012207363B2

(12) United States Patent
Suemitsu et al.

(10) Patent No.: US 12,207,363 B2
(45) Date of Patent: Jan. 21, 2025

(54) HEAT-RADIATING LIGHT SOURCE

(71) Applicant: Osaka Gas Co., Ltd., Osaka (JP)

(72) Inventors: Masahiro Suemitsu, Osaka (JP); Tadashi Saito, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 958 days.

(21) Appl. No.: 17/284,116

(22) PCT Filed: Sep. 3, 2019

(86) PCT No.: PCT/JP2019/034562
§ 371 (c)(1),
(2) Date: Apr. 9, 2021

(87) PCT Pub. No.: WO2020/079976
PCT Pub. Date: Apr. 23, 2020

(65) Prior Publication Data
US 2021/0385908 A1 Dec. 9, 2021

(30) Foreign Application Priority Data
Oct. 19, 2018 (JP) ................................ 2018-197562

(51) Int. Cl.
*H05B 3/00* (2006.01)
*H01K 1/08* (2006.01)
*H05B 3/12* (2006.01)

(52) U.S. Cl.
CPC ............. *H05B 3/0033* (2013.01); *H01K 1/08* (2013.01); *H05B 3/12* (2013.01)

(58) Field of Classification Search
CPC ........... H05B 3/0033; H05B 3/12; H01K 1/08
See application file for complete search history.

(56) References Cited

U.S. PATENT DOCUMENTS

| | | | | |
|---|---|---|---|---|
| 2010/0026420 A1* | 2/2010 | Chin | H03H 7/0115 333/175 |
| 2016/0172463 A1* | 6/2016 | Seike | H10N 70/00 438/584 |
| 2021/0243858 A1* | 8/2021 | Nagao | H05B 3/0033 |

FOREIGN PATENT DOCUMENTS

| | | | |
|---|---|---|---|
| JP | 2015138638 A * | 7/2015 |
| JP | 2015158995 A | 9/2015 |

(Continued)

OTHER PUBLICATIONS

Hideki T Miyazaki, Ultraviolet-nanoimprinted packaged metasurface thermal emitters for infrared CO2 sensing, May 20, 2015, National Institute for Materials Science, Science and Technology of Advanced Materials, 16 (Year: 2015).*

(Continued)

*Primary Examiner* — John J Norton
*Assistant Examiner* — Theodore J Evangelista
(74) *Attorney, Agent, or Firm* — The Webb Law Firm

(57) ABSTRACT

A heat-radiating light source including a heat-radiating layer and a substrate laminated thereon for heating the heat-radiating layer is disclosed. A heat-radiating layer and a substrate for heating the heat-radiating layer are laminated. In the heat-radiating layer, there are provided a radiation control portion and a radiating transparent oxide layer, the radiation control portion having an MIM lamination portion including a pair of platinum layers juxtaposed along lamination direction and a resonating transparent oxide layer formed of a transparent oxide and disposed between the pair of platinum layers, the radiation control portion and the radiating transparent oxide layer are laminated with the radiation control portion and the radiating transparent oxide layer are disposed closer to the substrate in this order. The (Continued)

resonating transparent oxide layer R has a thickness providing a resonance wavelength equal to or smaller than 4 μm.

13 Claims, 14 Drawing Sheets

(56) References Cited

FOREIGN PATENT DOCUMENTS

| | | | | |
|---|---|---|---|---|
| KR | 100450116 | B1 | * | 9/2004 |
| WO | 2018182013 | A1 | | 10/2018 |

OTHER PUBLICATIONS

Miyazaki et al., Ultraviolet-nanoimprinted packaged metasurface thermal emitters for infrared CO2 sensing, National Institute for Materials Science, Science and Technology of Advanced Materials, May 20, 2015, 16, Japan.

Shemelya et al., Stable high temperature metamaterial emitters for thermophotovoltaic applications, Applied Physics Letters, May 21, 2014, 201113-1-201113-4, 104.

* cited by examiner

| layer No | material | configuration1 | configuration2 | configuration3 | configuration4 |
|---|---|---|---|---|---|
| 5 | $Al_2O_3$ | 120nm | 150nm | 75nm | 195nm |
| 4 | Pt | 6nm | 6nm | 7.8nm | 6nm |
| 3 | $Al_2O_3$ | 120nm | 150nm | 114nm | 253nm |
| 2 | Pt | 150nm | 150nm | 150nm | 150nm |
| 1 | substrate(any) | – | – | – | – |

HEAT-RADIATING LIGHT SOURCE

CROSS-REFERENCE TO RELATED APPLICATIONS

This application is the United States national phase of International Application No. PCT/JP2019/034562 filed Sep. 3, 2019, and claims priority to Japanese Patent Application No. 2018-197562 filed Oct. 19, 2018, the disclosures of which are hereby incorporated by reference in their entirety.

BACKGROUND OF THE INVENTION

Field of the Invention

The present invention relates to a heat-radiating light source including a heat-radiating layer and a substrate laminated thereon for heating the heat-radiating layer.

Description of Related Art

Such heat-radiating light source is configured to cause the heat-radiating layer to emit radiant light for heating an object to be heated by heating the heat-radiating layer to a high temperature state by the substrate.

As an example of the heat-radiating light source, there is known a heat-radiating light source configured such that the substrate and the heat-radiating layer are disposed under a sealed state inside a sealed tube formed of an optical transparent sealing member such as quartz glass and the inside of the sealed tube is either evacuated or charged with inactive gas such as nitrogen gas (see e.g. Patent Document 1).

In Patent Document 1, the substrate is constituted of a high melting point metal such as tungsten which generates heat with supply of electric current thereto. The heat-radiating layer is formed of a metal layer such as tantalum, molybdenum, etc. As the substrate and the heat-radiating layer are disposed under a sealed state within the sealed tube, deterioration by oxidization of the substrate and the heat-radiating layer is prevented.

Patent Document 1: Japanese Unexamined Patent Application Publication No. 2015-138638

SUMMARY OF THE INVENTION

With the conventional heat-radiating light source, since the substrate and the heat-radiating layer are disposed under a sealed state within a sealed tube, the overall configuration thereof tends to be complicated and costly. Thus, there is a need for a heat-radiating light source that allows the substrate and the heat-radiating layer to be disposed under a state exposed to the atmosphere.

Further, there is also a need for a heat-radiating light source that has a high thermal emittance (emissivity) for narrowband wavelength equal to or smaller than 4 μm (i.e. narrowband wavelength equal to or smaller than the mid infrared) and a low thermal emittance (emissivity) for wavelength greater than 4 μm (i.e. the far infrared), for such purpose as heating a heating object (object to be heated) through quartz glass like a heating lamp.

Namely, when the heating object is to be heated through quartz glass, if far infrared light having a wavelength greater than 4 μm is emitted, the quartz glass will be heated to a high temperature by absorbing such far infrared light. Then, there will arise such inconvenience of needing significant arrangement for cooling the quartz glass, leading to greater complication in the entire facility for heating the heating object accommodated within the quartz tube.

The present invention has been made, with taking the above-described state of the art into consideration and its primary object is to provide a heat-radiating light source that allows the substrate and the heat-radiating layer to be disposed under a state exposed to the atmosphere and that also has a high thermal emittance for narrowband wavelength equal to or smaller than 4 μm and a low thermal emittance for wavelengths greater than 4 μm.

The present invention provides a heat-radiating light source including a heat-radiating layer and a substrate laminated thereon for heating the heat-radiating layer. According to its characterizing feature:

- in the heat-radiating layer, there are provided a radiation control portion and a radiating transparent oxide layer, the radiation control portion comprising an MIM lamination portion including a pair of platinum layers juxtaposed along a lamination direction of the heat-radiating layer and the substrate and a resonating transparent oxide layer formed of a transparent oxide and disposed between the pair of platinum layers, the radiation control portion and the radiating transparent oxide layer being laminated with the radiation control portion and the radiating transparent oxide layer being disposed closer to the substrate in this order; and
- the resonating transparent oxide layer has a thickness providing a resonance wavelength equal to or smaller than 4 μm.

Namely, the heat-radiating layer is configured such that the radiation control portion having an MIM lamination portion and the radiating transparent oxide layer are laminated to each other, with the radiation control portion and the radiating transparent oxide layer being disposed closer to the substrate in this order. Thus, when the heat-radiating layer is heated to a high temperature by the substrate, the radiation control portion having the MIM lamination portion emits radiant light and this radiant light is emitted from the radiating transparent oxide layer.

Although radiant light is emitted from the substrate which is rendered into a high temperature state for heating the heat-radiating layer, the platinum layer adjacent the substrate in the MIM lamination portion of the radiation control portion will block this radiant light of the substrate and suppress transmission of the radiant light of the substrate through the inside of the radiation control portion. As a result, adverse influence of the radiant light of the substrate to radiant light to be emitted from the radiation control portion is suppressed.

Also, since the radiating transparent oxide layer which has a refractive index smaller than the refractive index of platinum and greater than the refractive index of air is disposed on the side of the presence of the radiating transparent oxide layer in the radiation control portion (the side opposite to the presence of the substrate), the reflectance of the platinum layer disposed on the side of the presence of the radiating transparent oxide layer will be reduced, whereby the radiant light emitted from the radiation control portion can be emitted to the outside in a favorable manner.

And, the MIM lamination portion included in the radiation control portion is configured such that the resonating transparent oxide layer is interposed between the pair of platinum layers juxtaposed along the lamination direction of the heat-radiating layer and the substrate and the resonating transparent oxide layer has a thickness providing a resonance wavelength equal to or smaller than 4 μm. Thus, the 4 μm or smaller wavelength (i.e. narrowband wavelength equal to or smaller than the mid infrared) portion included in the radiant light emitted from the platinum layers heated to the high temperature state will be amplified by the resonance action, so that the radiant light emitted from the radiation control portion has a high emittance (emissivity) for the narrowband wavelength equal to or smaller than 4 μm (e.g. narrowband wavelength including near infrared having a wavelength equal to or greater than 0.8 μm and smaller than 2.5 μm and mid infrared having a wavelength equal to or greater than 2.5 μm and equal to or smaller than 4 μm) and a low emittance (emissivity) for wavelength greater than 4 μm (i.e. the far infrared). As a result, such amplified radiant light of narrowband wavelength equal to or smaller than 4 μm will be emitted from the radiating transparent oxide layer to the outside.

More particularly, the acronym "MIM" stands for metal insulator metal and the MIM lamination portion is configured to cause the 4 μm or smaller wavelength portion included in the radiant light emitted by the platinum layers be reflected back and forth repeated between the platinum layers (within the resonating transparent oxide layer) juxtaposed along the lamination direction of the heat-radiating layer and the substrate, thus amplifying this 4 μm or smaller wavelength portion of the radiant light and such amplified 4 μm or smaller wavelength portion of the radiant light will be emitted from the radiating transparent oxide layer to the outside.

Namely, the 4 μm or smaller wavelength portion of the radiant light is amplified as being reflected back and forth in repetition between the pair of platinum layers juxtaposed along the lamination direction of the heat-radiating layer and the substrate and a part of this 4 μm or smaller wavelength portion of the radiant light will be transmitted to the presence side of the radiating transparent oxide layer and emitted eventually from this radiating transparent oxide layer to the outside. As a result, the amplified 4 μm or smaller wavelength portion of the radiant light will be emitted from the radiating transparent oxide layer to the outside.

On the other hand, the wavelength portion greater than 4 μm included in the radiant light emitted from the platinum layers will be emitted from the radiating transparent oxide layer to the outside, with less amplification thereof by the resonance action.

Consequently, the radiant light emitted from the radiating transparent oxide layer to the outside has a high emittance (emissivity) for narrowband wavelength equal to or smaller than 4 μm (i.e. narrowband wavelength equal to or smaller than mid infrared) and a low emittance (emissivity) for wavelength greater than 4 μm (i.e. the far infrared).

Incidentally, the platinum layer adjacent the substrate included in the plurality of platinum layers provided in the MIM lamination portion needs to shield the radiant light of the substrate while the other platinum layer needs to allow transmission of the part of the radiant light therethrough. For this reason, the platinum layer adjacent the substrate will be formed thicker than the other platinum layer.

In this way, the heat-radiating layer will cause the amplified 4 μm or smaller wavelength radiant light to be emitted from the radiating transparent oxide layer to the outside and can also suppress oxidation deterioration of the radiation control portion and the substrate even when disposed in the air, so that the optical characteristics thereof can be maintained for an extended period of time.

More particularly, as the platinum layers of the MIM lamination layer are formed platinum and platinum has a positively large standard oxidation Gibbs energy in all temperature ranges, thus not being oxidized in the air. So, even when disposed in the air, these layers do not suffer oxidization deterioration.

Further, as the radiating transparent oxide layer and the resonating transparent oxide layer act to suppress transmission of oxygen in the air toward the substrate, even when the substrate is formed of certain oxidizable material, oxidization deterioration of the substrate can be suppressed for an extended period of time.

For these reasons, the heat-radiating layer, even if disposed in the air, can maintain its optical characteristics for an extended period of time.

Incidentally, the platinum forming the platinum layer adjacent the substrate, when heated to a high temperature, will have a risk of being fluidized and flocculated on the substrate. However, the resonating transparent oxide lawyer provides the action of suppressing such movements of platinum. Further, the platinum forming the platinum layer adjacent on the presence side of the radiating transparent oxide layer relative to the resonating transparent oxide layer, when heated to a high temperature, will have a risk of being fluidized and flocculated on the resonating transparent oxide layer. However, the radiating transparent oxide layer provides the action of suppressing such movements of platinum. From these respects too, the heat-radiating layer can maintain the optical characteristics for an extended period of time in this respect also.

In summary, according to the characterizing feature of the present invention, it has become possible to provide a heat-radiating light source that allows the substrate and the heat-radiating layer to be disposed under a state exposed to the atmosphere and that also has a high thermal emittance for narrowband wavelength equal to or smaller than 4 μm and a low thermal emittance for wavelength greater than 4 μm.

According to a further characterizing feature of the heat-radiating light source relating to the present invention, the radiation control portion has a plurality of the MIM lamination portions.

Namely, as a plurality of the MIM lamination portions each including a pair of platinum layers juxtaposed along the lamination direction of the substrate and the heat-radiating layer and a resonating transparent oxide layer disposed therebetween are provided, the amplification by the resonance effect can be provided sufficiently, whereby the 4 μm or smaller wavelength radiant light portion can be amplified appropriately.

In the above, the language of a plurality of MIM lamination portions being provided is understood to mean an arrangement of providing a resonating transparent oxide layer between each adjacent pair of three or more platinum layers juxtaposed along the lamination direction of the heat-radiating layer and the substrate.

Incidentally, in the case of an arrangement in which three platinum layers are provided in juxtaposition along the lamination direction of the heat-radiating layer and the substrate and the resonating transparent oxide layers are provided between the respective adjacent pairs of these platinum layers, namely, an arrangement of two MIM lamination portions being provided, the amplification will occur not only by the reflection between the adjacent platinum layers, but also by the reflection between the platinum layers disposed apart on the far opposite sides in the lamination direction of the heat-radiating layer and the substrate.

That is to say, in the case of such arrangement of providing three or more platinum layers along the lamination direction of the heat-radiating layer and the substrate, the action of repeatedly reflecting the radiant light will be provided not only between the adjacent platinum layers, but also between the platinum layers disposed with another or other platinum layer interposed therebetween.

Incidentally, in case a plurality of MIM lamination portions are provided, by varying the respective resonance wavelengths of these MIM lamination portions from each other, it becomes possible to obtain, as the amplified 4 μm or smaller wavelength radiant light, not only the near infrared having a wavelength equal to or greater than 0.8 μm and smaller than 2.5 μm and the mid infrared having a wavelength equal to or greater than 2.5 μm and smaller than 4 μm, but also visible light having a wavelength equal to or greater than 0.4 μm and smaller than 0.8 μm, and even ultraviolet light having a wavelength smaller than 0.4 μm.

In short, with the further characterizing feature of the heat-radiating light source relating to the present invention, the radiant light having wavelengths equal to or smaller than 4 μm can be amplified appropriately.

According to a still further characterizing feature of the inventive heat-radiating light source, between the substrate and the platinum layer adjacent the substrate in the radiation control portion, there is laminated a substrate adhesive layer.

Namely, since a substrate adhesive layer is laminated between the substrate and the platinum layer adjacent the substrate in the radiation control portion, pealing (exfoliation) of the radiation control portion off the substrate can be suppressed when the radiation control portion is heated by the substrate.

Namely, since the thermal expansion coefficient of the substrate differs from that of the radiation control portion comprised of lamination of a plurality of thin layers, there is a risk of the radiation control portion peeling off the substrate when the former is heated by the latter. However, in the above arrangement, as the adhesion between the substrate and the platinum layer adjacent the substrate in the radiation control portion is enhanced thanks to the substrate adhesive layer, such peeling of the radiation control portion off the substrate can be effectively suppressed.

In short, according to the still further characterizing feature of the inventive heat radiation light source, such peeling of the radiation control portion off the substrate can be effectively suppressed.

According to a still further characterizing feature of the inventive heat-radiating light source, between the platinum layer and the resonating transparent oxide layer in the MIM lamination portion and between the radiating transparent oxide layer and the platinum layer adjacent the radiating transparent oxide layer in the radiation control portion, respectively, there is laminated a platinum adhesive layer.

Namely, since here is laminated a platinum adhesive layer between the platinum layer and the resonating transparent oxide layer in the MIM lamination portion and between the radiating transparent oxide layer and the platinum layer adjacent the radiating transparent oxide layer in the radiation control portion, respectively, it is possible to suppress occurrence of the phenomenon of fluidization and subsequent flocculation of the platinum layers in the MIM lamination portion when the radiation control portion is heated to a high temperature state by the substrate and it is also possible to suppress the peeling-off between the platinum layer and the resonating transparent oxide layer and between the radiating transparent oxide layer and the platinum layer, due to the thermal expansion coefficient differences.

That is, due to low degree of adhesion between the platinum and the transparent oxide, when the radiation control portion is heated to a high temperature by the substrate, there arises the risk of the platinum layer adjacent the resonating transparent oxide layer or the platinum layer adjacent the radiating transparent oxide layer being fluidized and flocculated. However, with lamination of the platinum adhesive layers, it becomes possible to increase the degree of adhesion between the platinum layer adjacent the resonating transparent oxide layer and the resonating transparent oxide layer, and the degree of adhesion between the platinum layer adjacent the radiating transparent oxide layer and the radiating transparent oxide layer. As a result, when the radiation control portion is heated to a high temperature by the substrate, it is possible to suppress the fluidization and flocculation of the platinum layers in the MIM lamination portion and it is possible also to suppress the peeling-off between the platinum layer and the resonating transparent oxide layer and between the radiating transparent oxide layer and the platinum layer.

In short, according to the still further characterizing feature of the inventive heat radiation light source, when the radiation control portion is heated to a high temperature by the substrate, it is possible to suppress the fluidization and flocculation of the platinum layers in the MIM lamination portion.

According to a still further characterizing feature of the inventive heat-radiating light source, the substrate adhesive layer and the platinum adhesive layer are formed of titanium.

Namely, titanium can enhance the degree of adhesion between the platinum layer adjacent the substrate and this substrate and the degree of adhesion between the platinum layer adjacent the resonating transparent oxide layer and this resonating transparent oxide layer as well as the degree of adhesion between the platinum layer adjacent the radiating transparent oxide layer and this radiating transparent oxide layer and moreover titanium has a high melting point as high as 1668° C. Thus, when the radiation control portion is heated to a high temperature by the substrate, it is possible to suppress the fluidization and flocculation of the platinum layers in the MIM lamination portion appropriately.

Incidentally, titanium forming the substrate adhesive layer and the platinum adhesive layer may be changed into titanium oxide through use over time of the heat-radiating light source in the atmosphere. In other words, when the heat-radiating light source has been used in the atmosphere, it may be assumed that the substrate adhesive layer and the platinum adhesive layer are formed of titanium oxide.

However, the titanium forming the substrate adhesive layer and the platinum adhesive layer will not be entirely changed into titanium oxide. Rather, portions of the titanium placed in adhesion with the platinum layers will not be oxidized, but will maintain the state of titanium (metal state) adhering to the platinum layers.

Incidentally, the substrate adhesive layer and the platinum adhesive layer formed of titanium are provided in the form of thin films and titanium provided in the form of thin films will be changed into titanium oxide. However, as the titanium oxide has optical transparency, even through titanium is changed into titanium oxide, this does not provide adverse influence to the performance of the heat-radiating layer.

In short, according to the still further characterizing feature of the inventive heat-radiating light source, when the radiation control portion is heated to a high temperature by the substrate, it is possible to suppress the fluidization and flocculation of the platinum layers in the MIM lamination portion appropriately.

According to a still further characterizing feature of the inventive heat-radiating light source, the transparent oxide forming the resonating transparent oxide layer and the radiating transparent oxide layer comprises aluminum oxide or titanium oxide.

Namely, aluminum oxide and titanium oxide have small oxygen diffusion coefficients. Thus, by using aluminum oxide or titanium oxide as the transparent oxide forming the resonating transparent oxide layer and the radiating transparent oxide layer, permeation of oxygen in the atmosphere is appropriately suppressed, so that even in case the substrate is formed of an oxidizable material, it is possible to avoid oxidization deterioration of the side of the substrate on which the radiation control portion is laminated.

In short, according to the still further characterizing feature of the inventive heat-radiating light source, it is possible to avoid oxidization deterioration of the side of the substrate on which the radiation control portion is laminated.

According to a still further characterizing feature of the inventive heat-radiating light source, the substrate is configured to be self-heating with supply of electric power thereto.

Namely, as the substrate is configured to be self-heating, by supplying electric power thereto, the radiation control portion can be heated by the self-heating of the substrate. Therefore, there is no need to provide any special external heating portion for heating the substrate, so that simplification of the general configuration is made possible.

Incidentally, as some non-limiting examples of material capable of self-heating with supply of electric power thereto, metal materials such as Kanthal, nichrome, etc. can be cited. And, the substrate can be formed of such materials.

In short, according to the still further characterizing feature of the inventive heat-radiating light source, it is possible to achieve simplification of the overall configuration.

According to a still further characterizing feature of the inventive heat-radiating light source, the substrate is configured to be heated by an external heating portion.

Namely, since the substrate is configured to be heated by an external heating portion, it is possible to constitute the substrate of various kinds of non-oxidizable material such as quartz (silicon dioxide), sapphire, etc.

More particularly, by constituting the substrate of non-oxidizable material such as quartz (silicon dioxide), sapphire, etc., it is possible to appropriately suppress oxidization deterioration of the substrate.

In short, according to the still further characterizing feature of the inventive heat-radiating light source, it is possible to appropriately suppress oxidization deterioration of the substrate appropriately.

DESCRIPTION OF THE INVENTION

Next, embodiments of the present invention will be explained with reference to the accompanying drawings.

[Basic Configuration of Heat-Radiating Light Source]

Figures 1, 2:
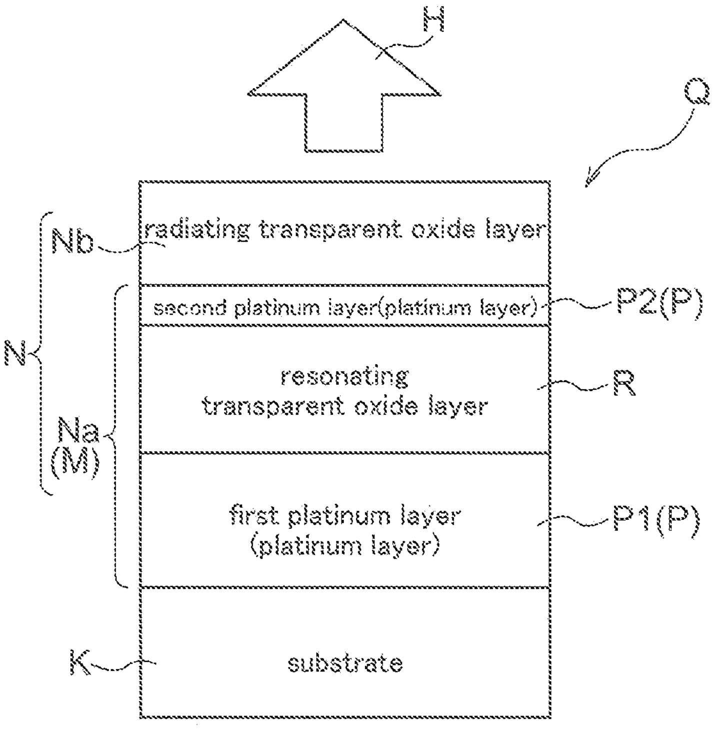
FIG. 1 is a view showing a basic configuration of a heat-radiating light source.
FIG. 2 is a table showing configuration examples of the basic configuration of the heat-radiating light source.

FIG. 1 shows a basic configuration of a heat-radiating light source Q. This heat-radiating light source Q is constituted of a heat-radiating layer N and a substrate K laminated with the heat-radiating layer N for heating this heat-radiating layer N.

The heat-radiating layer N is constituted of lamination of a radiation control portion Na and a radiating transparent oxide layer Nb formed of a transparent oxide, with the radiation control portion Na and the radiating transparent oxide layer Nb being disposed closer to the substrate K in this mentioned order.

The radiation control portion Na is configured to include an MIM lamination portion M having a resonating transparent oxide layer R formed of a transparent oxide interposed between a pair of platinum layers P juxtaposed along the lamination direction of the heat-radiating layer N and the substrate K.

The resonating transparent oxide layer R has a thickness providing a resonance wavelength equal to or smaller than 4 μm.

In the basic configuration of the heat-radiating light source Q shown in FIG. 1, the radiation control portion Na includes one MIM lamination portion M.

Namely, in this basic configuration of the heat-radiating light source Q, the platinum layers P and the resonating transparent oxide layer R together constituting the MIM lamination portion M, as well as the platinum layers P and the radiating transparent oxide layer Nb are laminated one after another in this mentioned order on top of the substrate K.

Incidentally, in the following discussion, the platinum layer P adjacent the substrate K and included in the MIM lamination portion will be referred to as a "first platinum layer P1", whereas the platinum layer P adjacent the radiating transparent oxide layer Nb and included also in the MIM lamination portion M will be referred to as a "second platinum layer P2".

In operation, by heating the heat-radiating layer N to a high temperature state (e.g. 800° C.) by the substrate K, the heat-radiating light source Q emits radiant light H from the heat-radiating layer N.

More particularly, an arrangement is made such that the radiant light H has a high emittance (emissivity) for narrowband wavelength equal to or smaller than 4 μm (e.g. narrowband wavelength including the near infrared having wavelength equal to or greater than 0.8 μm and smaller than 2.5 μm and the mid infrared having wavelength equal to or greater than 2.5 μm and smaller than 4 μm) and a low emittance (emissivity) for wavelength greater than 4 μm (i.e. the far infrared).

Figure 3:
FIG. 3 is a graph showing relations between the configuration examples of the heat-radiating light source and radiation spectra.

Namely, when the heat-radiating layer N is heated to a high temperature state (e.g. 800° C.) by the substrate K, the platinum layers P (the first platinum layer P1 and the second platinum layer P2) of the MIM lamination portion M included in the radiation control portion Na will emit the radiant light and, as shown in FIG. 3, emittances (emissivities) of this radiant light (radiant light from platinum) tend to increase progressively toward the short wavelength side in the wavelengths equal to or smaller than 4 μm and maintain small values in wavelengths greater than 4 μm.

And, the resonating transparent oxide layer R included in the MIM lamination portion M has a thickness providing a resonance wavelength equal to or smaller than 4 μm. Thus, the 4 μm or smaller wavelength portion included in the radiant light emitted from the platinum layers P (the first platinum layer P1 and the second platinum layer P2) of the MIM lamination portion M will be amplified by the resonance action, so that the radiation control portion Na has a high emittance (emissivity) for narrowband wavelength equal to or smaller than 4 μm (e.g. band wavelength including the near infrared having a wavelength equal to or greater than 0.8 μm and smaller than 2.5 μm and the mid infrared having wavelength equal to or greater than 2.5 μm and smaller than 4 μnarrow m) and a low emittance (emissivity) for wavelengths greater than 4 μm (i.e. the far infrared). As a result, such amplified radiant light H of narrowband wavelength equal to or smaller than 4 μm will be emitted from the radiating transparent oxide layer Nb to the outside.

More particularly, the acronym "MIM" stands for Metal Insulator Metal and the MIM lamination portion M is configured to cause the 4 μm or smaller wavelength portion included in the radiant light emitted by the platinum layers P (the first platinum layer P1 and the second platinum layer P2) to be reflected back and forth repeatedly between these pair of platinum layers (the first platinum layer P1 and the second platinum layer P2) juxtaposed along the lamination direction of the heat-radiating layer N and the substrate K, thus amplifying this 4 μm or smaller wavelength portion of the radiant light and such amplified 4 μm or smaller wavelength portion of the radiant light will be emitted from the radiating transparent oxide layer Nb to the outside.

Namely, the 4 μm or smaller wavelength portion of the radiant light is amplified as being reflected back and forth in repetition between the pair of platinum layers (the first platinum layer P1 and the second platinum layer P2) juxtaposed along the lamination direction of the heat-radiating layer N and the substrate K and a part of this 4 μm or smaller wavelength portion of the radiant light will be transmitted to the presence side of the radiating transparent oxide layer Nb and emitted from this radiating transparent oxide layer Nb to the outside. As a result, the amplified 4 μm or smaller wavelength portion of the radiant light will be emitted from the radiating transparent oxide layer Nb to the outside.

On the other hand, the wavelength portion greater than 4 μm included in the radiant light emitted from the platinum layers P (the first platinum layer P1 and the second platinum layer P2) will be emitted from the radiating transparent oxide layer Nb to the outside, with less amplification thereof by the resonance action.

Consequently, the radiant light H emitted from the heat-radiating light source Q (the radiant light emitted from the radiating transparent oxide layer Nb to the outside) has a high emittance (emissivity) for a narrowband wavelength equal to or smaller than 4 μm (e.g. narrowband wavelength equal to or smaller than the wavelength of the mid infrared) and a low emittance (emissivity) for wavelength greater than 4 μm (i.e. the far infrared).

Incidentally, although radiant light is emitted from the substrate K which is rendered into a high temperature state for heating the heat-radiating layer N, the first platinum layer P1 will shield this radiant light. In other words, the thickness of the first platinum layer P1 is set a thickness able to shield the radiant light from the substrate K.

Also, since the radiating transparent oxide layer Nb has a refractive index which is smaller than the refractive index of platinum and greater than the refractive index of air, the reflectance of the platinum layer P (the second platinum layer P2) disposed on the side of the presence of the radiating transparent oxide layer Nb will be reduced, whereby the radiant light emitted from the radiation control portion Na can be emitted to the outside in a favorable manner.

Incidentally, of the platinum layers P (the first platinum layer P1 and the second platinum layer P2) to be included in the MIM lamination portion M, the platinum layer P (the first platinum layer P1) adjacent the substrate K needs to shield the radiant light from the substrate K, whereas the other platinum layer P (the second platinum layer P2) needs to allow permeation of a part of the radiant light, so the platinum layer P (the first platinum layer P1) adjacent the substrate K is formed thicker than the other platinum layer P (the second platinum layer P2). For this reason, the radiation intensity of the platinum layer P adjacent the substrate K (the first platinum layer P1) of the platinum layers P (the first platinum layer P1 and the second platinum layer P2) is greater than that of the other platinum layer P (the second platinum layer P2).

Incidentally, preferably, the heat-radiating light source Q according to the present invention has a "configuration of providing a high emittance for the range equal to or smaller than 4 μm, with a maximum emittance equal to or greater than 90% being present in the range from 0.8 μm to 4 μm (the near infrared to the mid infrared range), while providing a low emittance for the far infrared range equal to or greater than 4 μm, with no emittance peak present therein (this configuration will be referred to as the "appropriate configuration" hereinafter).

[Explanation of Configuration Examples of Basic Configuration]

Next, configuration examples of the basic configuration of the heat-radiating light source Q will be explained. In the configuration examples to be described next, the transparent oxide forming the radiating transparent oxide layer Nb and the resonating transparent oxide layer R is alumina (aluminum oxide, $Al_2O_3$). Incidentally, as the substrate K, any can be used. Details of this substrate K will be described later.

The configuration examples to be described next, as shown in the table of FIG. 2, are four configuration examples: Configurations 1-4. Incidentally, in the table shown in FIG. 2, the substrate K is described as layer No. 1, the first platinum layer P1 is described as layer No. 2, the resonating transparent oxide layer R is described as layer No. 3, the second platinum layer P2 is described as layer No. 4, and the radiating transparent oxide layer Nb is described as layer No. 5, respectively.

The heat-radiating light sources Q of Configurations 1-4, as shown in FIG. 3, radiates radiant light H having large emittances (emissivities) in the narrowband wavelength including near infrared having a wavelength equal to or greater than 0.8 μm and smaller than 2.5 μm and mid infrared having a wavelength equal to or greater than 2.5 μm and equal to or smaller than 4 μm and having small emittances (emissivities) in the range greater than 4 μm (namely, the far infrared).

And, in case the layer No. 3 of the resonating transparent oxide layer R has a small film thickness (thickness), the resonance frequency is shifted to the shorter wavelength side, so that the peak position of the emittance is shifted to the shorter wavelength side. In the case of layer No. 3 of the resonating transparent oxide layer R has a large film thickness (thickness), the resonance frequency is shifted to the longer wavelength side, so that the peak position of the emittance tends to be shifted to the longer wavelength side.

Further, in case the layer No. 4 of the second platinum layer P2 has a large film thickness (thickness), the band of the peaks of the emittance spectrum becomes narrower and in case the layer No. 4 of the second platinum layer P2 has a small film thickness (thickness), the band of the peaks of the emittance spectrum tends to be wider. Further, the greater the film thickness (thickness) of the layer No. 5 of the radiating transparent oxide layer Nb, the longer wavelength side the spectrum of the emittance tends to be shifted.

In case the heat-radiating light source Q is provided with the appropriate configuration described above, the preferred range of the film thickness (thickness) of the first platinum layer P1 is e.g. equal to or greater than 10 nm and the preferred range of the film thickness (thickness) of the second platinum layer P2 is e.g. equal to or greater than 1.5 nm and equal to or smaller than 18 nm.

Next, additional explanation will be made on the preferred ranges of the film thicknesses (thicknesses) of the first platinum layer P1 and the second platinum layer P2.

Figure 11:
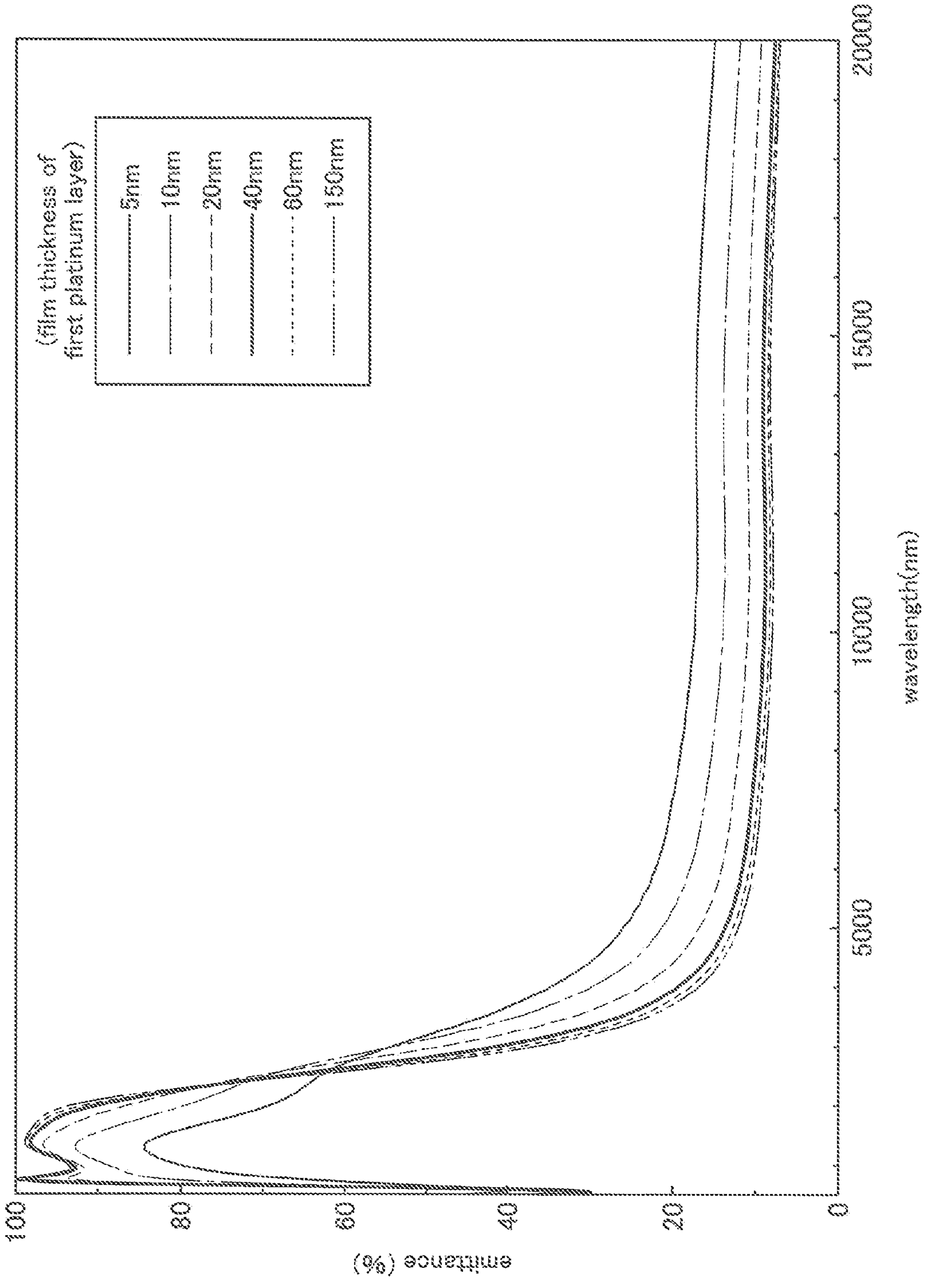
FIG. 11 is a graph showing relations between thicknesses of a first platinum layer and radiation spectra.

FIG. 11 shows the relation between the film thickness (thickness) of the first platinum layer P1 and the emittance of the heat-radiating light source Q of Configuration 2. When the film thickness (thickness) of the first platinum layer P1 is varied from 5 to 150 nm, the emittance peak does not exceed 90% if the film thicknesses (thicknesses) of the first platinum layer P1 is 5 nm, but exceeds 90% if it is 10 nm.

Further, as the film thicknesses (thicknesses) of the first platinum layer P1 is increased, the radiation spectrum is less variable and the radiation spectrum is substantially fixed when the film thicknesses (thicknesses) is around 60 nm. In this way, there is no upper limit in the definition of the film thicknesses (thicknesses) of the first platinum layer P1.

Based on the above-described results, the preferred range of the film thicknesses (thicknesses) of the first platinum layer P1 is equal to or greater than 10 nm, for example.

Figure 12:
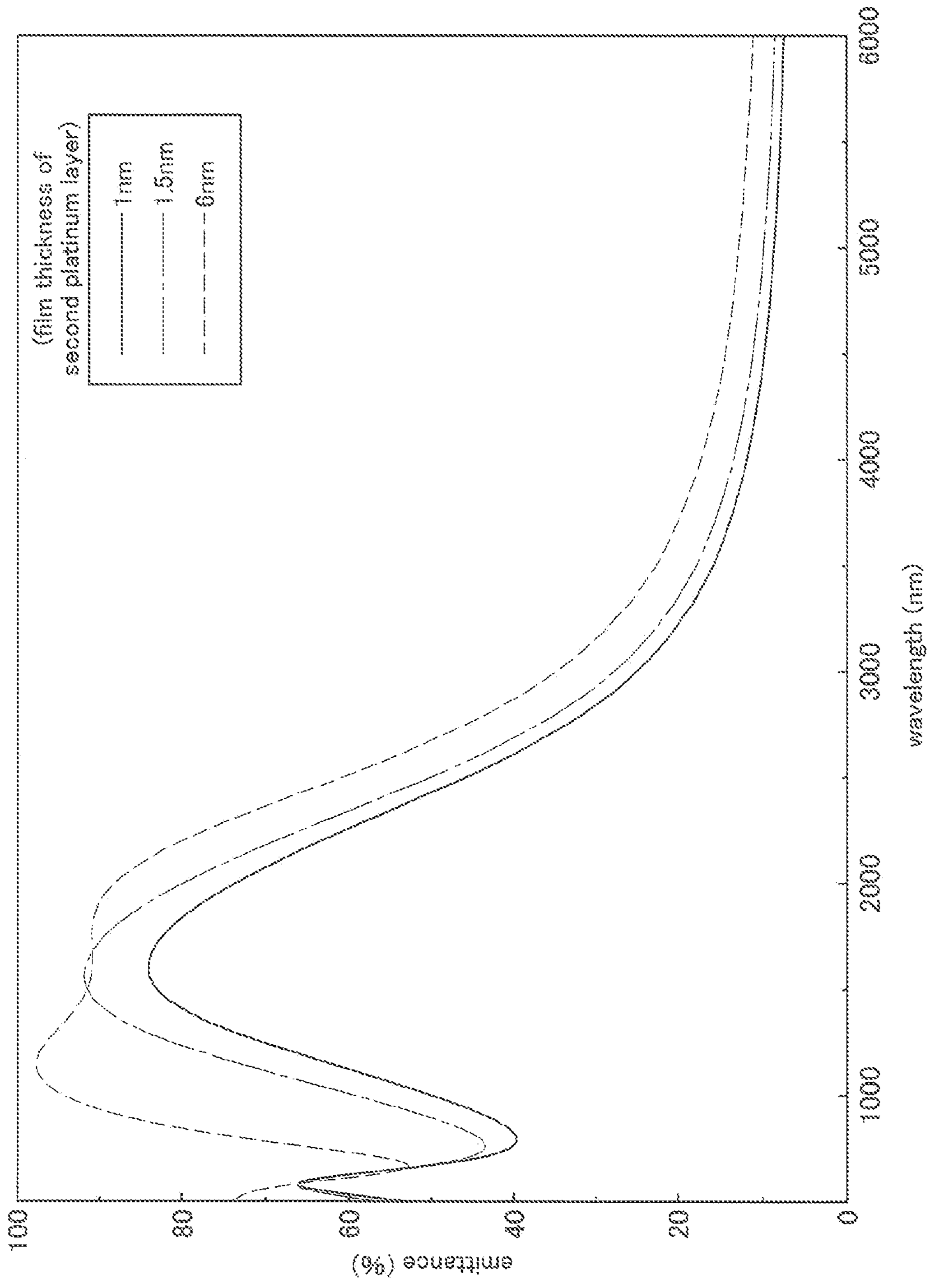
FIG. 12 is a graph showing relations between thicknesses of a second platinum layer and radiation spectra.

FIG. 12 shows relation between the film thickness (thickness) of the second platinum layer P2 and emittance. FIG. 12 illustrates the radiation spectra when the film thicknesses (thicknesses) of the second platinum layer P2 is varied to 1 nm, 1.5 nm and 6 nm in case the thickness of the first platinum layer P1 is set to 150 nm, the thickness of the resonating transparent oxide layer R is set to 140 nm and the thickness of the radiating transparent oxide layer Nb is set to 75 nm.

When the film thickness of the second platinum layer P2 is greater than 1.5 nm, the emittance peak exceeds 90%, but does not exceed 90% in case the thickness is smaller.

Figure 13:
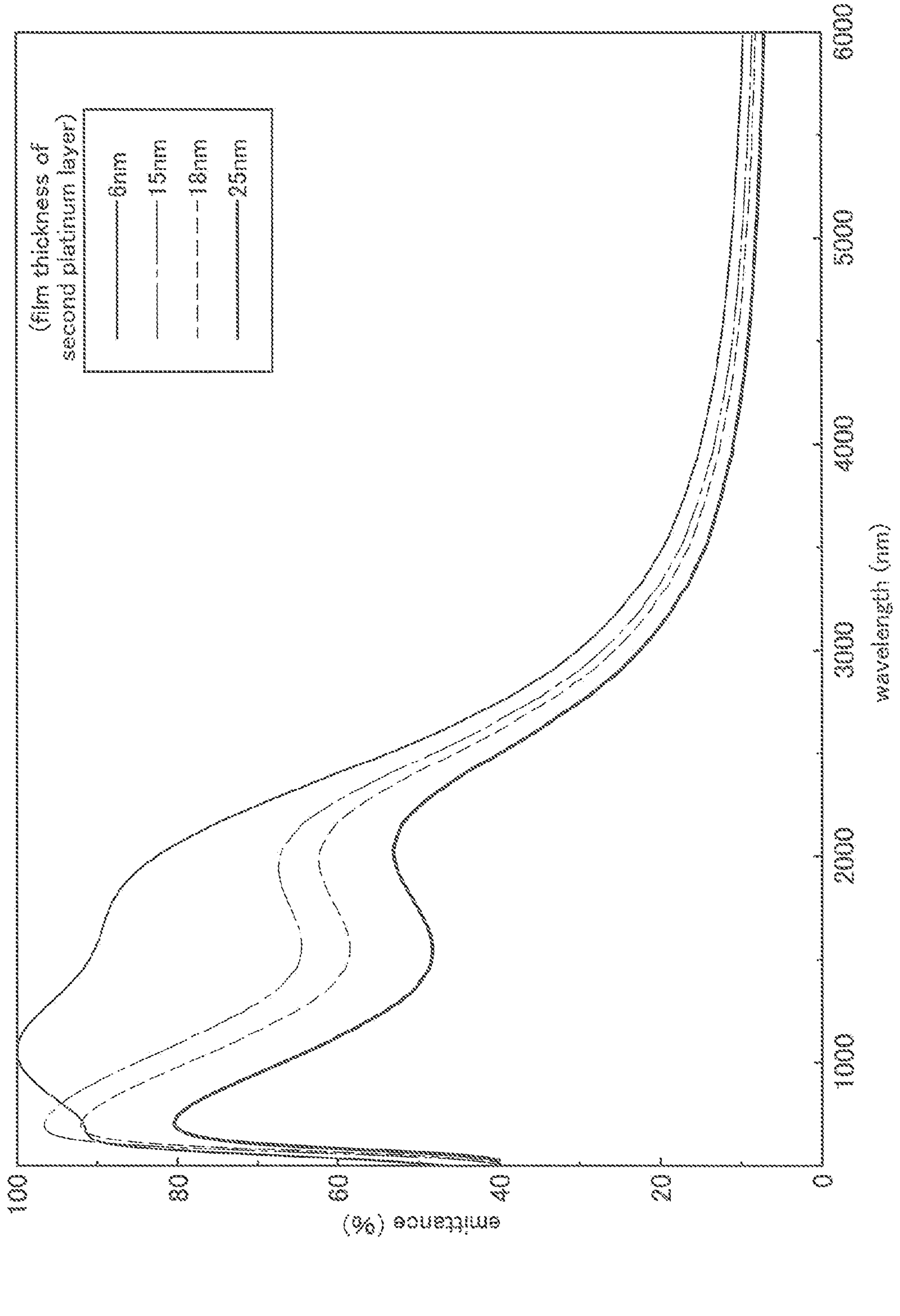
FIG. 13 is a graph showing relations between thicknesses of a second platinum layer and radiation spectra.

FIG. 13 shows relation between the film thickness (thickness) of the second platinum layer P2 and the emittance. It is understood, however, that FIG. 13 shows the radiation spectra when the film thickness (thickness) of the second platinum layer P2 is varied to 6 nm, 15 nm, 18 nm and 25 nm, in case the thickness of the first platinum layer P1 is set to 150 nm, the thickness of the resonating transparent oxide layer R is set to 140 nm and the thickness of the radiating transparent oxide layer Nb is set to 100 nm, respectively.

The emittance peak becomes 90% when the film thickness of the second platinum layer P2 is set to 19 nm and the emittance peak becomes smaller when it becomes greater than 19 nm.

Based on the above-described results, the preferred range of the film thicknesses (thicknesses) of the second platinum layer P2 is equal to or greater than 1.5 nm and equal to or smaller than 18 nm, for example.

In case the heat-radiating light source Q is provided with the above-described appropriate configuration, the preferred range of the thickness (film thickness) of the resonating transparent oxide layer R providing a resonance wavelength equal or smaller than 4 μm is equal to or greater than 60 nm and equal to or smaller than 1050 nm, in case the transparent oxide is alumina ($Al_2O_3$).

Next, additional explanation will be given on the preferred range of the thickness (film thickness) of the resonating transparent oxide layer R formed of alumina ($Al_2O_3$).

Figure 14:
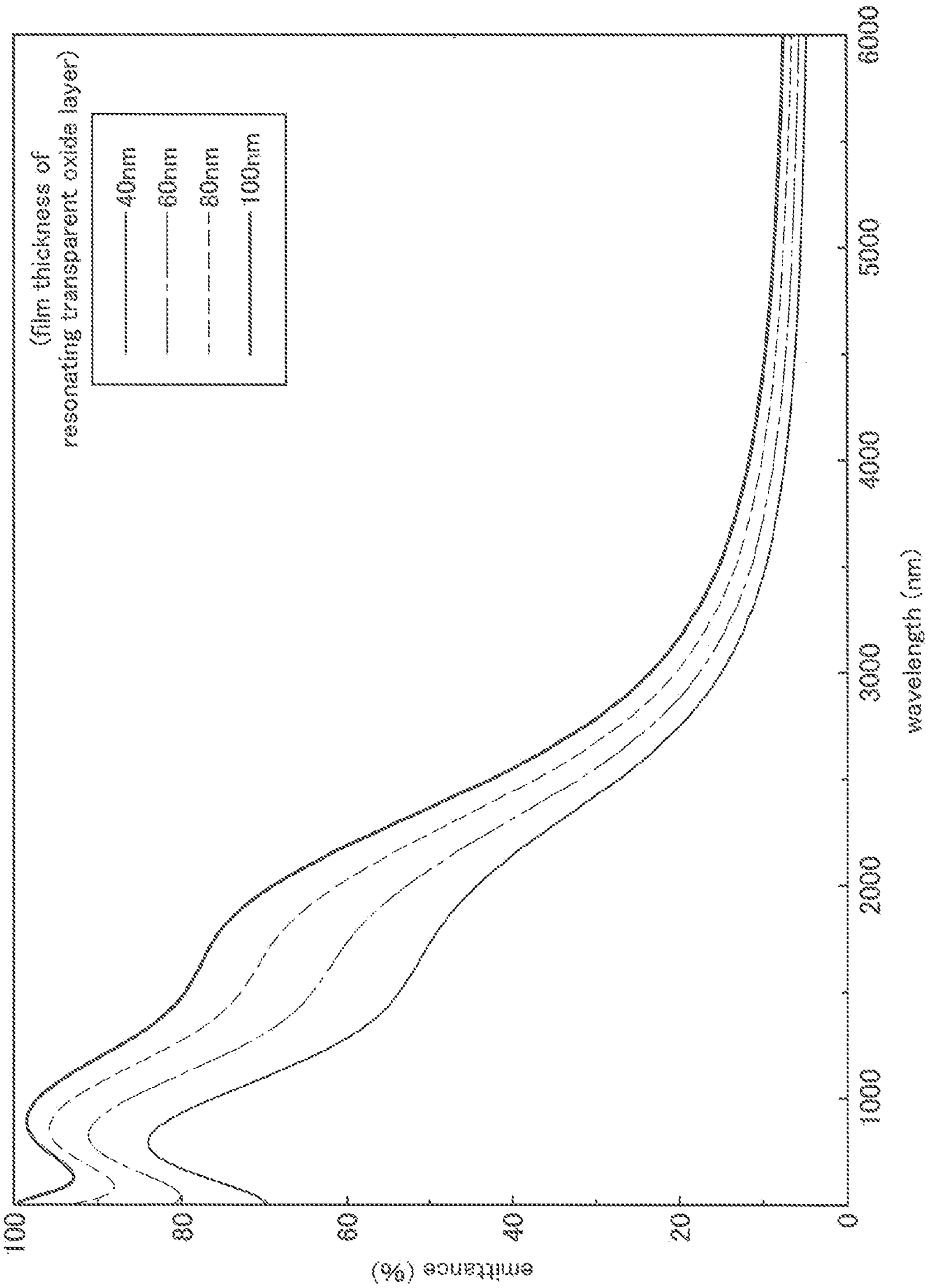
FIG. 14 is a graph showing relations between thicknesses of the resonating transparent oxide layer and radiation spectra.

FIG. 14 shows relation between the thickness (film thickness) of the resonating transparent oxide layer R and the emittance of the heat-radiating light source Q. It is understood, however, that FIG. 14 shows the radiation spectra when the film thickness (thickness) of the resonating transparent oxide layer R is varied to 40 nm, 60 nm, 80 nm and 100 nm, in case the thickness of the first platinum layer P1 is set to 150 nm, the thickness of the second platinum layer P2 is set to 6.6 nm, and the thickness of the radiating transparent oxide layer Nb is set to 94 nm.

From this FIG. 14, it may be understood that the lower limit of the film thickness (thickness) of the resonating transparent oxide layer R for the emittance to exceed 90% for 800 nm where the emittance peaks is 60 nm.

Figure 15:
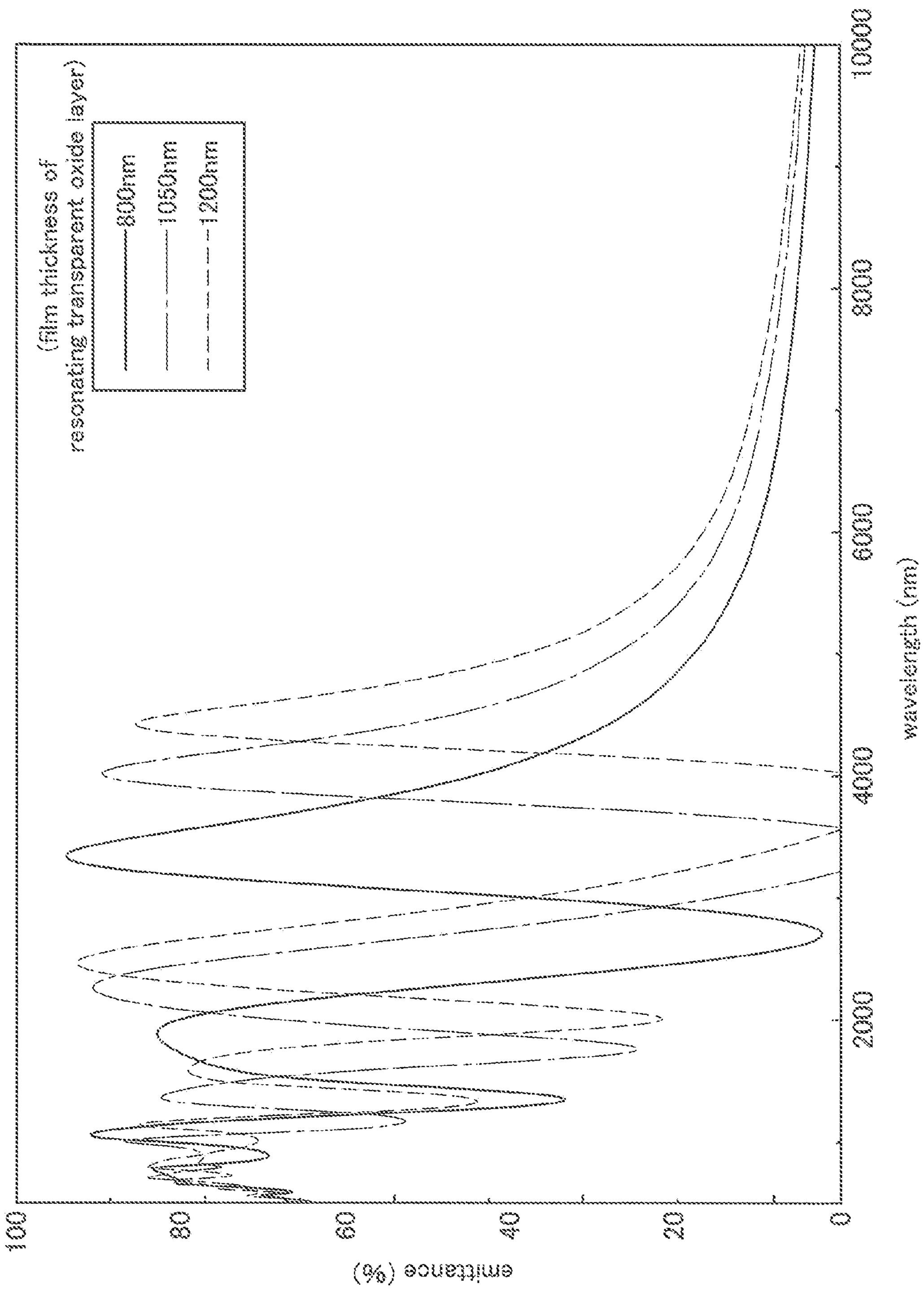
FIG. 15 is a graph showing relations between thicknesses of the resonating transparent oxide layer and radiation spectra.

FIG. 15 shows relation between the thickness (film thickness) of the resonating transparent oxide layer R and the emittance of the heat-radiating light source Q. It is understood, however, that FIG. 15 shows the radiation spectra when the film thickness (thickness) of the resonating transparent oxide layer R is varied to 800 nm, 1050 nm and 1200 nm, in case the thickness of the first platinum layer P1 is set to 150 nm, the thickness of the second platinum layer P2 is set to 10 nm and the thickness of the radiating transparent oxide layer Nb is set to 100 nm.

From this FIG. 15, it may be understood that the emittance peak appears in the long wavelength range (far infrared range) longer than 4000 nm, if the film thickness (thickness) of the resonating transparent oxide layer R becomes greater than 1050 nm.

Based on the above result, the preferred range of the thickness (film thickness) of the resonating transparent oxide layer R having a resonance wavelength equal to or smaller than 4 μm is equal to or greater than 60 nm and equal or smaller than 1050, in case the transparent oxide is alumina ($Al_2O_3$).

Incidentally, the preferred range of the thickness (film thickness) of the resonating transparent oxide layer R varies according to the refractive index of the transparent oxide.

The lower limit of the preferred range is: (lower limit of film thickness of each material (unit: nm))=−30.4 n+108, where n is the refractive index of the respective material.

Further, the upper limit of the preferred range is: (upper limit of film thickness of each material (unit: nm))=−600 n+2030, where n is the refractive index of the respective material.

Meanwhile, in case the heat-radiating light source Q is provided with the above-described appropriate configuration, the preferred range of the thickness (film thickness) of the radiating transparent oxide layer Nb of layer No. 5 is equal or greater than 50 nm and equal to or smaller than 500 nm.

Incidentally, FIG. 3 shows the radiation spectra of the platinum (platinum alone), but from comparison between this radiation spectra of platinum (platinum alone) and the radiation spectra of Configurations 1-4, it is understood that the emittance increases in the near infrared and mid infrared ranges and also that the contrast between the portion of large emittance and the portion of small emittance becomes greater.

[Alternative Modes of Basic Configuration]

In the above-described basic configuration, there was illustrated the case in which the radiation control portion Na includes one MIM lamination portion M. Alternatively, the radiation control portion Na may include a plurality of MIM lamination portions.

Incidentally, such provision of a plurality of MIM lamination portions means that there are provided three or more platinum layers P3 juxtaposed along the lamination direction of the heat-radiating layer N and the substrate K and the resonating transparent oxide layer R is disposed between each adjacent pair of platinum layers P.

Figure 4:
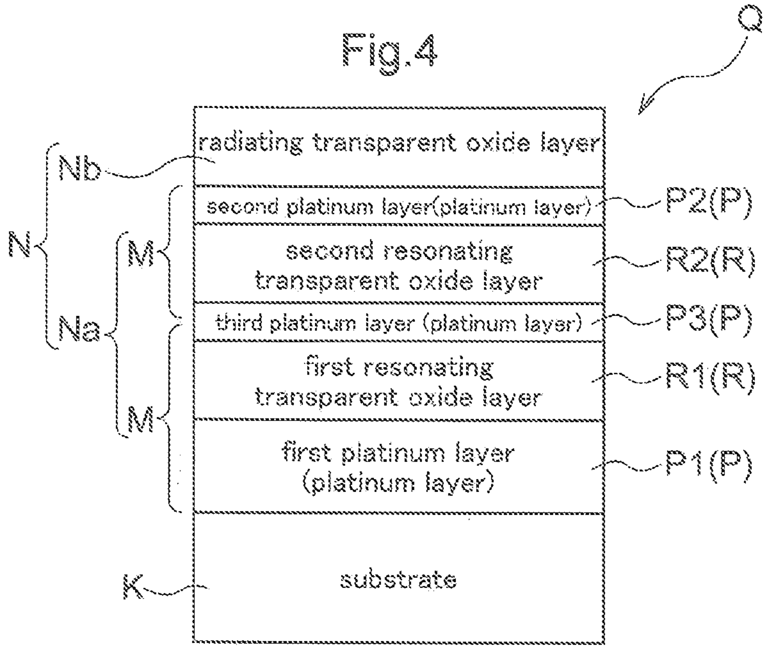
FIG. 4 is a view showing an alternative mode of the basic configuration of the heat-radiating light source.

FIG. 4 illustrates a case in which the radiation control portion Na includes two MIM lamination portions M. In the following discussion, this illustrated heat-radiating light source Q will be referred to as "Configuration 5".

In this Configuration 5, as the platinum layers P, there are provided a first platinum layer P1 adjacent the substrate K, a second platinum layer P2 adjacent the radiating transparent oxide layer Nb, and a third platinum layer P3 disposed between the first platinum layer P1 and the second platinum layer P2.

Further, as the resonating transparent oxide layer R, there are provided a first resonating transparent oxide layer R1 disposed between the first platinum layer P1 and the third platinum layer P3 and a second resonating transparent oxide layer R2 disposed between the second platinum layer P2 and the third platinum layer P3.

In Configuration 5, the transparent oxide forming the radiating transparent oxide layer Nb and the resonating transparent oxide layer R is alumina ($Al_2O_3$). Incidentally, as the substrate K, any substrate may be used. However, details of the substrate K will be explained later.

And, the first platinum layer P1, the third platinum layer P3 and the first resonating transparent oxide layer R1 together constitute one MIM lamination portion M, and the second platinum layer P2, the third platinum layer P3 and the second resonating transparent oxide layer R2 together constitute another MIM lamination portion M. As a result, the radiation control portion Na is provided with two MIM lamination portions M.

Figure 5:
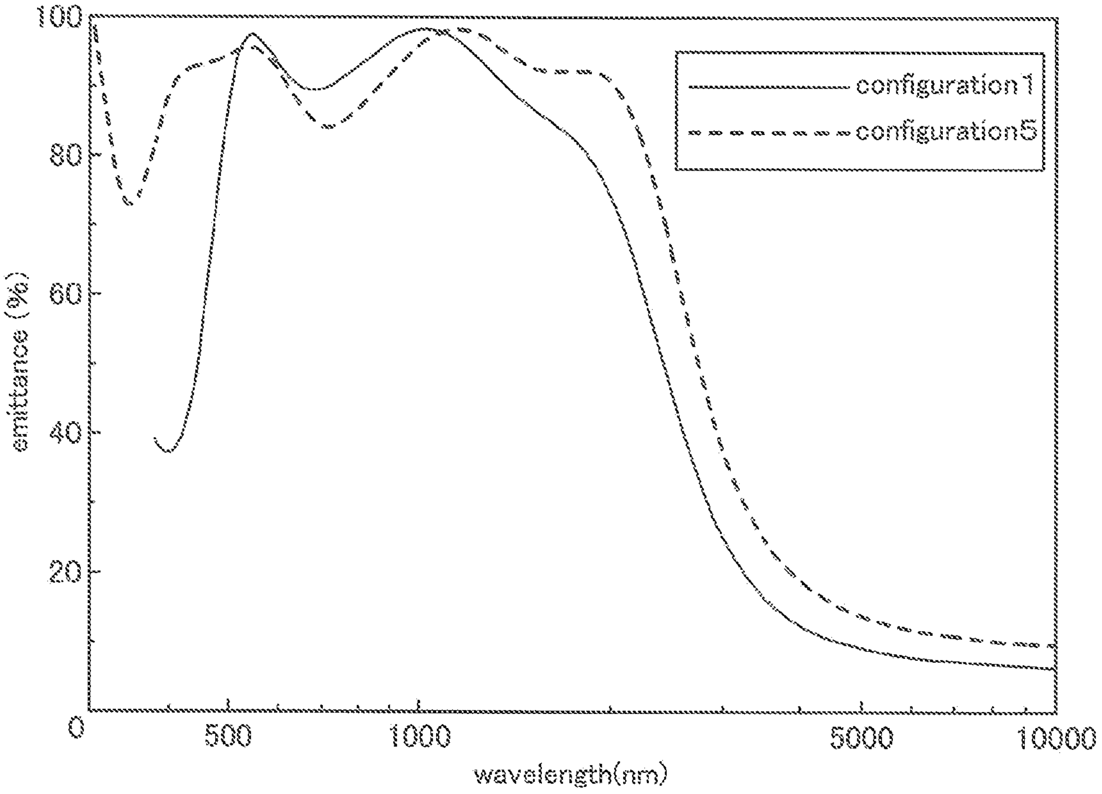
FIG. 5 is a graph showing relations between the alternative mode of the basic configuration of the heat-radiating light source and radiation spectra.

FIG. 5 shows the radiation spectra in which in Configuration 5, the thickness of the first platinum layer P1 is set to 150 nm, the thickness of the first resonating transparent oxide layer R1 is set to 65 nm, the thickness of the third platinum layer P3 is set to 8 nm, the thickness of the second resonating transparent oxide layer R2 is set to 145 nm, the thickness of the second platinum layer P2 is set to 5 nm, and the thickness of the radiating transparent oxide layer Nb is set to 72 nm, respectively.

Incidentally, FIG. 5 shows the radiation spectra of Configuration 5 also.

In Configuration 5, since the resonance frequencies of the two MIM lamination portions are made different from each other, as shown in FIG. 5, the visible light wavelength equal to or greater than 0.4 um and smaller than 0.8 nm can be resonated also. As a result, as the amplified radiant light H having a wavelength equal or smaller than 4 um, there is obtained a radiant light H containing, in addition to the near infrared having a wavelength equal to or greater than 0.8 μm and smaller than 2.5 μm and the mid infrared having a wavelength equal to or greater than 2.5 μm and smaller than 4 μm, the visible light having a wavelength equal or greater than 0.4 μm and smaller than 0.8 μm as swell as the ultraviolet beam having a wavelength smaller than 0.4 μm.

[Selection of Transparent Oxide]

In the above-described basic configuration and alternate modes of basic configuration of the heat-radiating light source Q, there was shown the case in which the transparent oxide forming the radiating transparent oxide layer Nb and the resonating transparent oxide layer R is alumina ($Al_2O_3$). As the transparent oxide, it is possible to employ also tantalum pentoxide ($Ta_2O_5$), silicon dioxide ($SiO_2$), niobium pentoxide ($Nb_2O_5$), magnesium oxide (MgO), titanium oxide ($TiO_2$), hafnium oxide ($HfO_2$), etc.

Incidentally, alumina ($Al_2O_3$) and titanium oxide ($TiO_2$) have small oxygen diffusion coefficients, so these are particularly preferred for as the transparent oxide for forming the radiating transparent oxide layer Nb and the resonating transparent oxide layer R.

Figure 6:
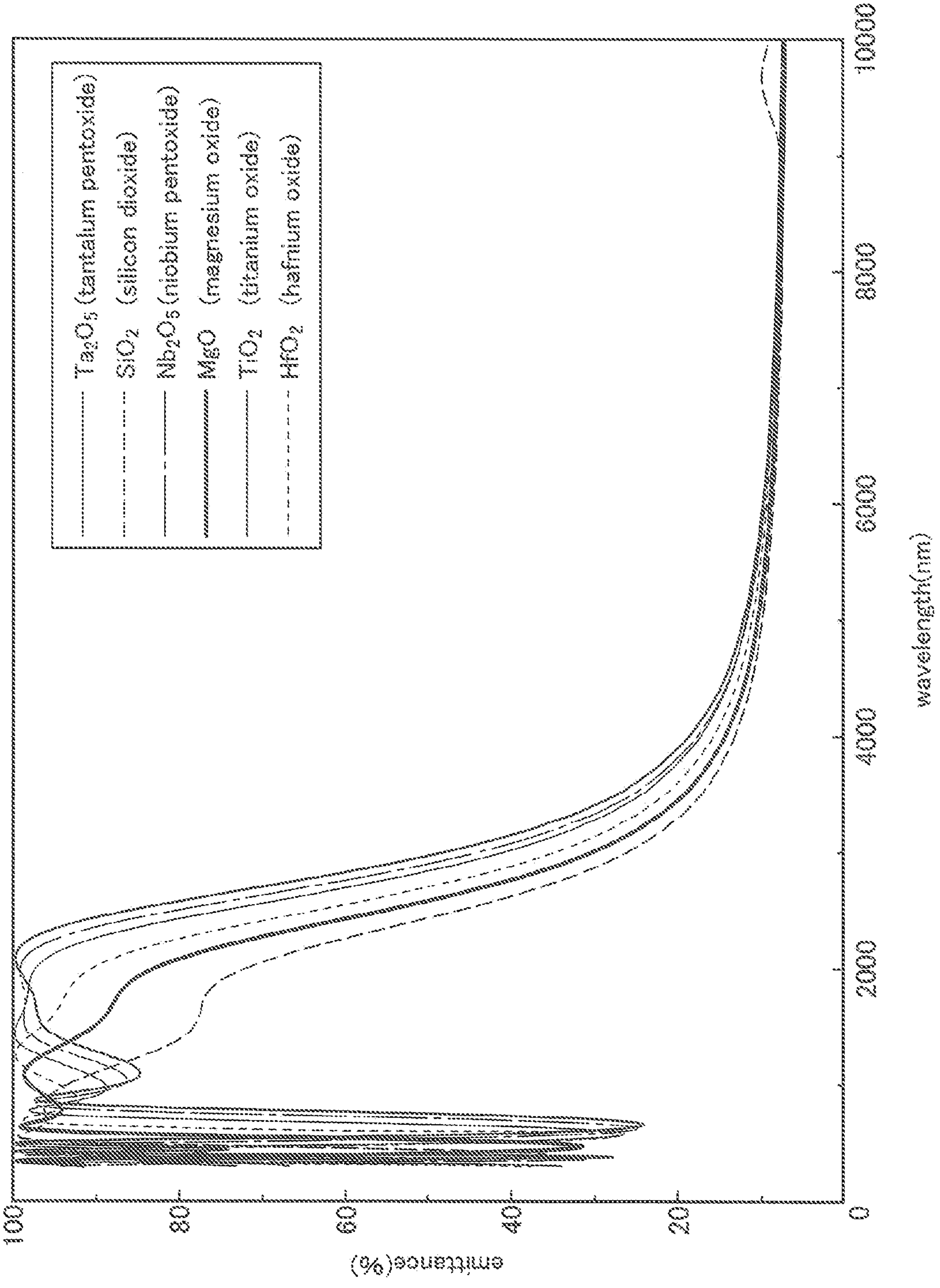
FIG. 6 is a graph showing relations between types of transparent oxide of the heat-radiating light source and radiation spectra.

FIG. 6 shows the radiation spectra where the transparent oxides are varied in the above-described basic configuration. More particularly, this view shows the radiation spectra when the transparent oxide forming the radiating transparent oxide layer Nb and the resonating transparent oxide layer R are varied in case the thickness of the first platinum layer P1 is set to 150 nm, the thickness of the resonating transparent oxide layer R is set to 120 nm, the thickness of the second platinum layer P2 is set to 8 nm, and the thickness of the radiating transparent oxide layer Nb is set to 120 nm.

As shown in FIG. 6, even when any one of tantalum pentoxide ($Ta_2O_5$), silicon dioxide ($SiO_2$), niobium pentoxide ($Nb_2O_5$), magnesium oxide (MgO), titanium oxide ($TiO_2$), hafnium oxide ($HfO_2$) is used as the transparent oxide forming the radiating transparent oxide layer Nb and the resonating transparent oxide layer R, amplified radiant light H having a wavelength equal or smaller than 4 μm can be emitted.

[Specific Arrangement of Heat-Radiating Light Source]

Figure 7:
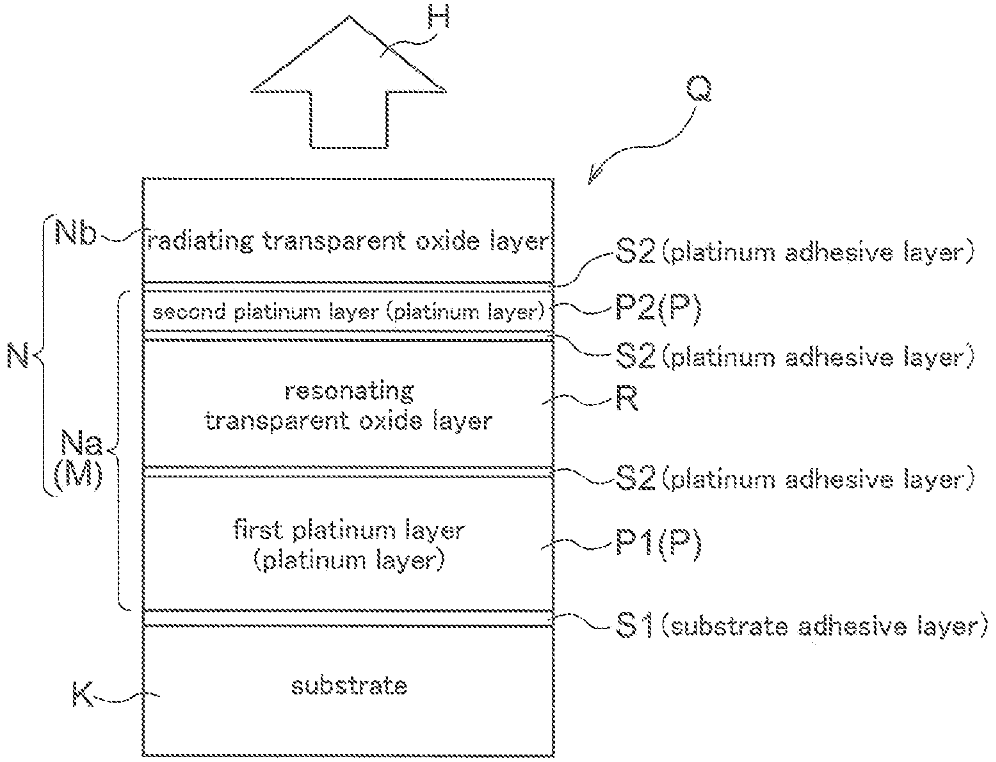
FIG. 7 is a view showing a specific configuration of the heat-radiating light source.

One specific arrangement of the heat-radiating light source Q, as shown in FIG. 7, is that a substrate adhesive layer S1 is laminated between the substrate K and the platinum layer P (the first platinum layer P1 included in the radiation control portion Na and adjacent the substrate, and platinum adhesive layers S2 are laminated between the platinum layers (the first platinum layer P1 and the second platinum layer P2) and the resonating transparent oxide layer R all included in the MIM lamination portion M and between the radiating transparent oxide layer Nb and the platinum layer P (the second platinum layer P2) included in the radiation control portion Na and adjacent the radiating trans transparent oxide layer Nb, respectively.

Namely, since the substrate adhesive layer S1 is laminated between the substrate K and the platinum layer P (the first platinum layer P1) included in the radiation control portion Na and adjacent the substrate K, peeling of the radiation control portion Na off the substrate K is suppressed when this radiation control portion Na is heated by the substrate K.

More particularly, since the thermal expansion coefficient of the substrate K significantly differs from that of the radiation control portion Na comprised of lamination of a plurality of thin films or layers, when the radiation control portion Na is heated by the substrate K, there is the possibility of the radiation control portion Na being peeled off (exfoliated from) the substrate K. However, the substrate K and the platinum layer P (the first platinum layer P1) included in the radiation control portion Na and adjacent the substrate K are provided with a degree of adhesion enhanced by the substrate adhesive layer S1, such peeling of the radiation control portion Na off the substrate K is effectively suppressed.

Moreover, since the platinum adhesive layers S2 are provided respectively between the platinum layer P (the first platinum layer P1 and the second platinum layer P2) and the resonating transparent oxide layer R in the MIM lamination portion M and between the radiating transparent oxide layer Nb and the platinum layer P (the second platinum layer P2) adjacent the radiating transparent oxide layer Nb included in the radiation control portion Na, when the radiation control portion Na is heated to a high temperature state by the substrate K, fluidization and subsequent flocculation of the platinum layers P (the first platinum layer P1 and the second platinum layer P2) in the MIM lamination portion M is effectively suppressed. As a result, peeling detachment (exfoliation) between the platinum layer P and the resonating transparent oxide layer R and the peeling detachment between the platinum layer P and the radiating transparent oxide layer Nb are effectively suppressed.

Namely, due to weak adhesion between platinum and the transparent oxide, when the radiation control portion Na is heated to a high temperature by the substrate K, there is the risk of fluidization and flocculation of the platinum layer P adjacent the resonating transparent oxide layer R and/or the platinum layer P adjacent the radiating transparent oxide layer Nb. However, with the lamination of the platinum adhesive layer S2, the degree of adhesion of the platinum layer P adjacent the resonating transparent oxide layer R to the resonating transparent layer R and/or the degree of adhesion of the platinum layer P adjacent the radiating transparent oxide layer Nb to the radiating transparent oxide layer Nb, fluidization and flocculation of the platinum layers P in the MIM lamination portion M can be suppressed when the radiation control portion Na is heated to a high temperature by the substrate K.

As the material for forming the substrate adhesive layer S1 and the platinum adhesive layer S2, titanium (Ti) and chrome (Cr) are superior in terms of the melting point and the adhesion. Titanium (Ti) is particularly preferred. In the following, an explanation will be given on the assumption that the substrate adhesive layer S1 and the platinum adhesive layer S2 are formed of titanium (Ti).

Namely, titanium (Ti) can effectively enhance the adhesion of the platinum layer P (the first platinum layer P1) adjacent the substrate K to the substrate K, the adhesion of the platinum layers P (the first platinum layer P1 and the second platinum layer P2) adjacent the resonating transparent oxide layer R to the resonating transparent oxide layer R, and the adhesion of the platinum layer P (the second platinum layer P2) adjacent the radiating transparent oxide layer Nb to the radiating transparent oxide layer Nb. Moreover, since titanium (Ti) has a high melting point as high as 1668° C., when the radiation control portion Na is heated to a high temperature by the substrate K, the fluidization and flocculation of the platinum layers P (the first platinum layer P1 and the second platinum layer P2) in the MIM lamination portion M can be appropriately suppressed.

[Thickness of Substrate Adhesive Layer]

When the substrate adhesive layer S1 is rendered into a high temperature state, this will emit radiant light having a wavelength greater than 4 μm (i.e. far infrared). However, as such radiant light emitted from the substrate adhesive layer S1 is shielded by the first platinum layer P1, in this respect, a large thickness (film thickness) of the substrate adhesive layer S1 does not provide any problem.

Notwithstanding the above, if the substrate adhesive layer S1 is too thick, this will invite a risk that when the radiation control portion Na is heated to a high temperature state by the substrate K, there can occur significant movements of the titanium (Ti) due to the heat, which may appear in the surface of the first platinum layer P1 on the side of the presence of the resonating transparent oxide layer R. If this phenomenon occurs, this will lead to collapse of the heat radiation control structure of the radiation control portion Na, thus making the control of heat radiation difficult.

On the other hand, if the substrate adhesive layer S1 is too thin, it will become impossible to cope with the difference between the thermal expansion coefficient of the radiation control portion Na having a plurality of thin layers (films) and the thermal expansion coefficient of the substrate K, leading to a risk of the peeling of the radiation control portion Na off the substrate K.

From the above-described viewpoints, the film thickness of the substrate adhesive layer S1 (film thickness of titanium) should range preferably from 2 nm or greater to 15 nm or smaller.

[Thickness of Platinum Adhesive Layer]

The thickness (film thickness) of the platinum adhesive layer S2 needs to be set from two viewpoints of optical characteristics and durability.

Namely, if the thickness (film thickness) of the platinum adhesive layer S2 is too large, this is optically disadvantageous. Specifically, when the platinum adhesive layer S2 is rendered into a high temperature state, this will emit radiant light having a wavelength greater than 4 μm (i.e. far infrared). Therefore, if the thickness (film thickness) of the platinum adhesive layer S2 is too large, this will result in increase of the intensity of the radiant light from the platinum adhesive layer S2, which is detrimental for the radiant light from the radiation control portion Na to have a low emittance (emissivity) for the wavelength greater than 4 μm (i.e. far infrared).

Moreover, if the thickness (film thickness) of the platinum adhesive layer S2 is too large, this will shield the radiant light. Therefore, too large thickness (film thickness) of the platinum adhesive layer S2 needs to be avoided. Incidentally, with too large thickness, the peak of the emittance equal to or smaller than 4 μm becomes equal to or smaller than 90%.

However, the platinum adhesive layer S2 is provided not for adhering the substrate K to the thin film, but for adhering thin films to each other. Therefore, its adhesive effect can be exerted even if it is thinner than the substrate adhesive layer S1.

From the above-described viewpoints, the thickness (film thickness) of the platinum adhesive layer S2 should range preferably from 0.1 nm or greater to 10 nm or smaller.

Figure 9:
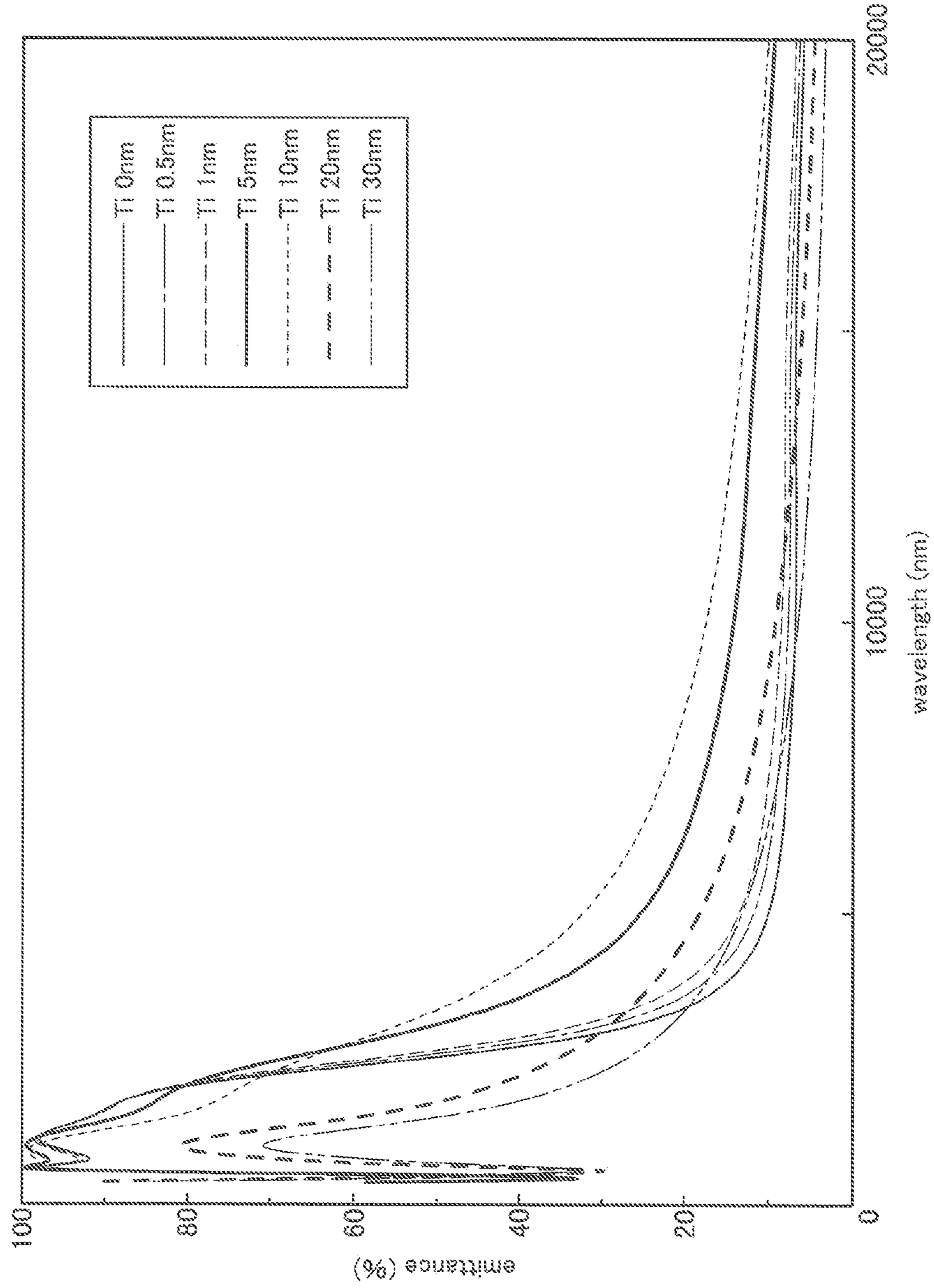
FIG. 9 is a graph showing relations between thicknesses of a platinum adhesive layer and radiation spectra.

FIG. 9 shows the relation between the thickness (film thickness) of the platinum adhesive layer S1 and the emittance (emissivity) of the heat-radiating light source Q.

Incidentally, in FIG. 9, the thickness (film thickness) of the platinum adhesive layer S2 is varied in case the thickness of the substrate adhesive layer S1 is set to 7 nm, the thickness of the first platinum layer P1 is set to 150 nm, the thickness of the resonating transparent oxide layer is set to 120 nm, the thickness of the second platinum layer P2 is set to 6 nm and the thickness of the radiating transparent oxide layer Nb is set to 120 nm, respectively.

Studying this FIG. 9, it is understood that the greater the thickness (film thickness) of the platinum adhesive layer S2, the greater the amount of the far infrared on the wavelength side greater than 4 μm.

[Oxidization of Titanium]

Titanium (Ti) forming the substrate adhesive layer S1 and the platinum adhesive layer S2 has a high possibility of being gradually oxidized into titanium oxide ($TiO_2$), from the use of the heat-radiating light source Q in the atmosphere. In other words, when the heat-radiating light source Q has been used in the atmosphere, it may be assumed that the substrate adhesive layer S1 and the platinum adhesive layers S2 are formed of titanium oxide ($TiO_2$).

Figure 8:
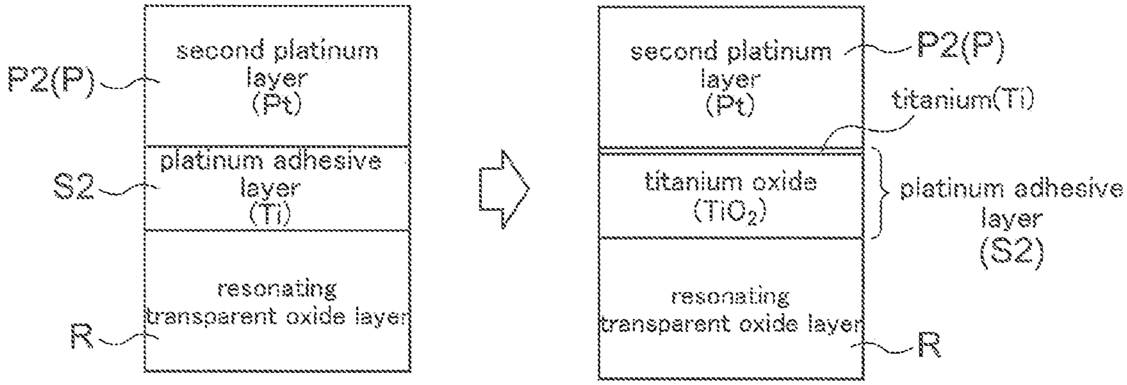
FIG. 8 is a view showing a change of a resonating transparent oxide layer.

However, as shown in FIG. 8, the titanium forming the platinum adhesive layer S2 will not be entirely changed into titanium oxide. Rather, the titanium placed in adhesion with the platinum layer P (the second platinum layer P2) will not be oxidized, but will maintain the state of titanium (metal state) placed in adhesion with the platinum layer P (the second platinum layer P2).

Though not shown, the titanium forming the substrate adhesive layer S1 too will not be entirely changed into titanium oxide. Rather, the titanium placed in adhesion with the platinum layer P (the first platinum layer P1) will not be oxidized, but will maintain the state of titanium (metal state) placed in adhesion with the platinum layer P (the first platinum layer P1).

Namely, the titanium forming the substrate adhesive layer S1 and the platinum adhesive layers S2 will not be changed into titanium oxide, but the portions of titanium adhering to the platinum layers P will maintain their states of adhering to the platinum layers P, thus continuing to provide their functions as the substrate adhesive layer S1 and the platinum adhesive layer S2.

More particularly, since platinum (Pt) has a standard oxidization Gibbs energy change of +200 k/mol/$O_2$, it does not react with oxygen (the chemical reaction proceeds in the direction of the Gibbs energy change being negative, the positive Gibbs energy change means no reaction). This means that use of an oxide as an adhesive layer for platinum (Pt) is difficult in terms of the bonding energy. For this reason, if titanium changes into titanium oxide through its oxidization, this may no longer function as the adhesive layer for platinum (Pt). In fact, even if titanium is oxidized, titanium present in the interface with platinum (Pt), it maintains its atomic bonding to platinum, so it maintains the functions as the substrate adhesive layer S1 and the platinum adhesive layer S2.

Incidentally, the substrate adhesive layer S1 and the platinum adhesive layer S2 formed of titanium will be provided in the form of thin films in order to obtain desired optical transparency, and titanium prepared in such form of thin films will be changed into titanium oxide. However, since titanium oxide has transparency, such change of titanium to titanium oxide will not adversely affect the performance of the heat-radiating layer N.

Meanwhile, if possible oxidization of the material forming the substrate adhesive layer S1 and the platinum adhesive layer S2 is taken into consideration, chrome (Cr) which becomes black-colored when oxidized will not be suitable as the adhesive layers from the viewpoint of radiation control. Whereas, titanium (Ti) which is oxidized to form transparent titanium oxide ($TiO_2$) is superior from the viewpoint of radiation control.

Incidentally, if titanium (Ti) of the platinum adhesive layer S2 is subject to oxidization over time, it may be believed that even if the thickness of the platinum adhesive layer S2 is large, the heat radiation will eventually become similar to that of the case of its thickness (film thickness) being small shown in FIG. 8. However, if the thickness (film thickness) is large, there will arise the possibility that when the radiation control portion Na is heated to a high temperature state by the substrate K, there can occur significant movements of the titanium (Ti) due to the heat, which may appear in the surface of the second platinum layer P2. If this phenomenon occurs, this will lead to collapse of the heat radiation control structure of the radiation control portion Na, thus making the control of heat radiation difficult. Especially, since the platinum of the second platinum layer P2 is thin, such movements of titanium (Ti) will significantly affect the collapse of the heat radiation control structure.

Therefore, it is desirable that the thickness (film thickness) of the platinum adhesive layer S2 be in the sub-nm range (about 1 nm or less).

[Change Over Time of Heat-Radiating Light Source]

Figure 10:
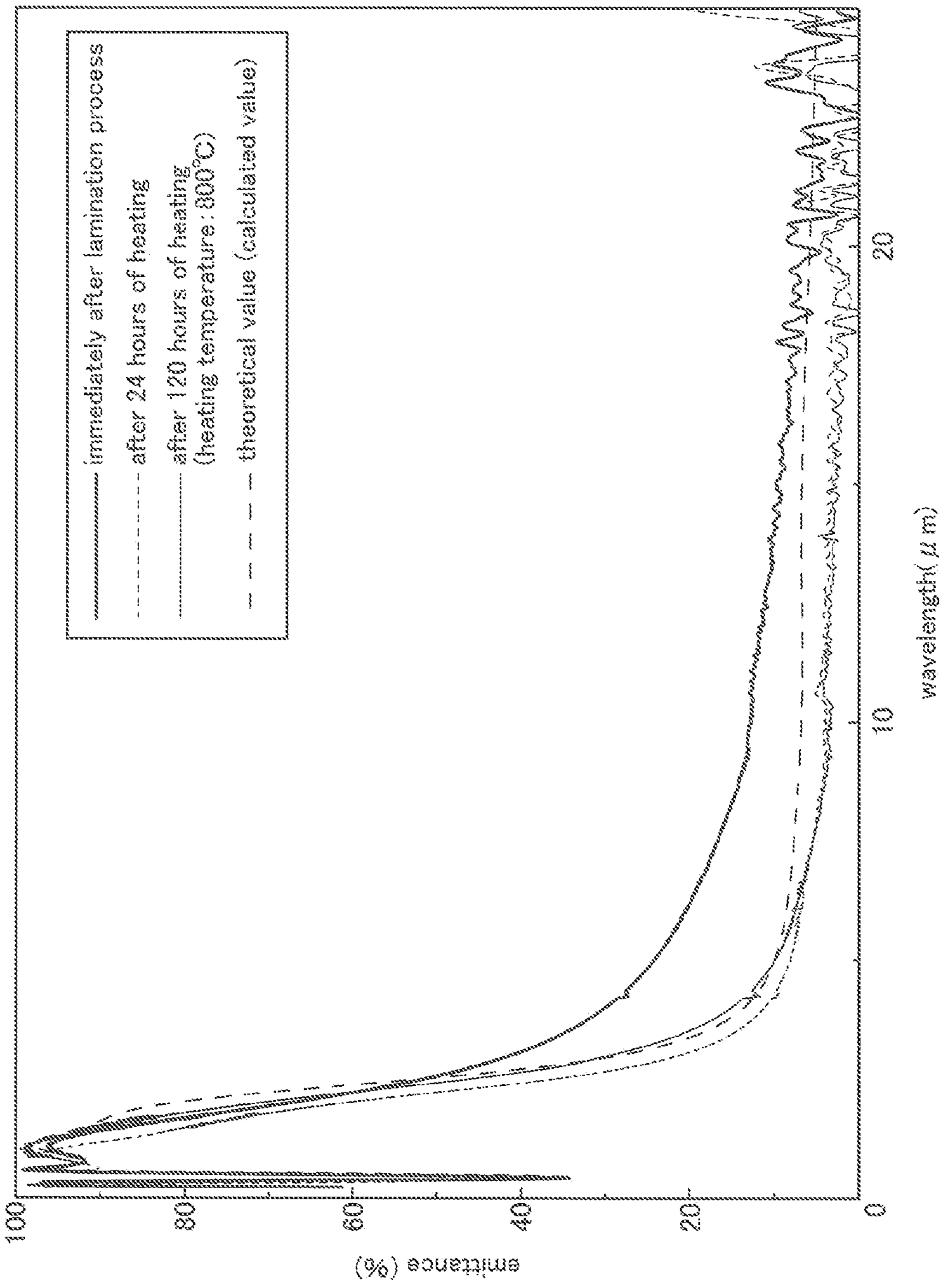
FIG. 10 is a graph showing relations between the change of the resonating transparent oxide layer and the radiation spectra.

FIG. 10 shows overtime change of the heat radiation spectrum when an actually made heat-radiating light source Q was used as being heated to 800° C. in the atmosphere.

Incidentally, FIG. 10 illustrates the heat radiation spectra of the heat-radiating light source Q in case sapphire was employed in the substrate K, the thickness of the substrate adhesive layer S1 was set to 7 nm, the thickness of the first platinum layer P1 was set to 150 nm, the thickness of the resonating transparent oxide layer was set to 120 nm, the thickness of the second platinum adhesive layer P2 was set to 6 nm, the thickness of the radiating transparent oxide layer Nb was set to 120 nm and the thickness of the platinum adhesive layer S2 was set to 0.5 nm, respectively.

Figure 20:
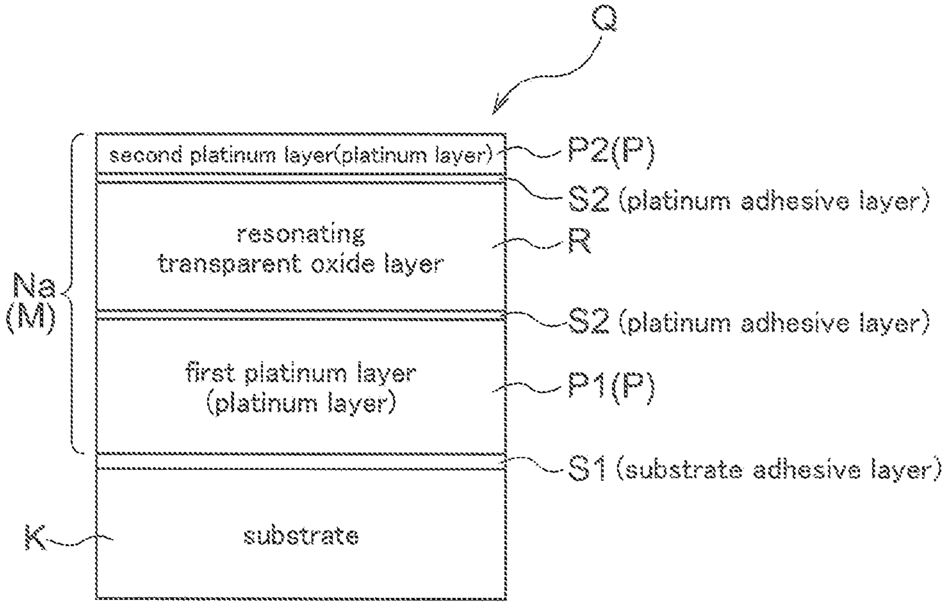
FIG. 20 is a view showing a heat-radiating light source of a reference example.

Incidentally, as shown in FIG. 20, if the platinum adhesive layer S2 to the surface of the second platinum layer P2 on the side of the presence of the radiating transparent oxide layer Nb and the radiating transparent oxide layer Nb were omitted while the substrate K, the substrate adhesive layer S1, the first platinum layer P1, the platinum adhesive layer S2, the resonating transparent oxide layer R and the second platinum layer P2 were retained, in the course of heating, the platinum (Pt) of the second platinum layer P2 was flocculated to scatter the light, thus being unable to emit radiant light appropriately.

As shown in FIG. 10, the heat radiation spectrum obtained after 120 hours of heating (5 days) is substantially same as the heat radiation spectrum obtained after 24 hours (one day) of heating.

The heat radiation spectrum immediately after lamination process differs from the heat radiation spectra after the 24 hours of heating and 120 hours of heating. The possible reason for this is the heating resulted in increase of the crystalline property of alumina ($Al_2O_3$) or platinum (Pt).

The theoretical value (calculated value) of the heat radiation spectrum was calculated with using the optical constant of highly crystalline alumina ($Al_2O_3$).

Although the heat radiation spectrum immediately after the lamination differs from the heat radiation spectrum of the theoretical value (calculated value). Whereas, the heat radiation spectrum after heating is extremely near the value of the heat radiation spectrum of the theoretical value (calculated value). Thus, it is believed that as the crystalline property of alumina ($Al_2O_3$) or the platinum (Pt) was increased by heating, the optical constant of the alumina ($Al_2O_3$) or the platinum (Pt) approached the theoretical value.

As shown by the results described above, the heat-radiating light source Q of this invention is a heat-radiating light source that can be used as being heated to 800° C. approximately in the atmosphere.

Incidentally, referring to the melting points of the materials of the inventive heat-radiating light source Q, platinum (Pt) has a melting point of 1768° C., alumina ($Al_2O_3$) has a melting point of 2072° C., titanium has a melting point of 1668° C., titanium oxide has a melting point of 1843° C. Thus, though depending on the melting point of the substrate K, the heat-radiating layer N of the inventive heat-radiating light source Q can withstand a temperature up to 1400° C. approximately.

[Substrate]

In view of the fact that the radiant light of the substrate K rendered into a high temperature state is shielded by the first platinum layer P1, thus not being transmitted to the radiation control portion Na, as the material (matrix) of the substrate K, various kinds of material can be used, such as quartz ($SiO_2$), sapphire, stainless steel (SUS), Kanthal, nichrome, aluminum, silicon, etc.

While there will arise no problem in case a substrate K formed of an oxide-based material is employed, in the case of using a substrate K formed of a metal-based material, when it is used as being heated in the atmosphere, oxidization deterioration of the substrate K will become problematic. However, thanks to the presence of the resonating transparent oxide layer R and the radiating transparent oxide layer Nb, the oxidization deterioration of the surface of the substrate K on the side of the presence of the heat-radiating layer N will be prevented.

Incidentally, the surface of the substrate K on the side of the presence of the heat-radiating layer N will be formed as a mirror surface of such a degree that does not cause diffuse reflection.

The substrate K may be configured to be self-heat generating or may be configured to be heated by an external heating portion U.

Namely, in case the substrate K is formed of a material, e.g. Kanthal, nichrome, etc. which generates heat in response to supply of electric power thereto, the substrate K can be configured to be self heat generating with supply of electric power thereto.

Whereas, in case the substrate K is formed of such material as quartz ($SiO_2$), sapphire, stainless steel (SUS), etc., the substrate K will be configured to be heated by an external heating portion U, as shown in FIGS. 16-19.

Figure 16:
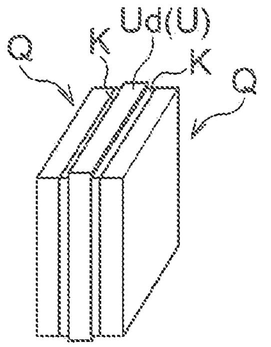
FIG. 16 is a perspective view showing relation between the heat-radiating light source and a heating electrode.
Figure 17:
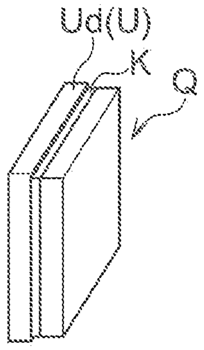
FIG. 17 is a perspective view showing relation between the heat-radiating light source and a heating electrode.

FIG. 16 and FIG. 17 show cases where the external heating portion U is formed as plate-like heating electrodes Ud having a heater wire which generates heat with supply of electric power thereto and the substrate K of the radiating-heat light source Q is disposed in adhesion with the heating electrode Ud.

Incidentally, FIG. 17 shows a case in which the heat-radiating light source Q is disposed on one side face of the heating electrode Ud, whereas FIG. 16 shows a case in which the heat-radiating light sources Q are disposed on the opposed side faces of the heating electrode Ud.

Figure 18:
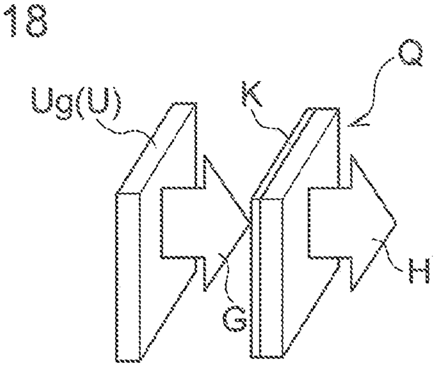
FIG. 18 is a perspective view showing relation between the heat-radiating light source and a heating electrode.

FIG. 18 shows a case in which the external heating portion U is configured as a heat-radiating source Ug for radiating radiant light G whose wavelength is not controlled; in this case, the substrates K of the heat-radiating light sources Q are disposed in opposition to the heat-radiating source Ug.

Figure 19:
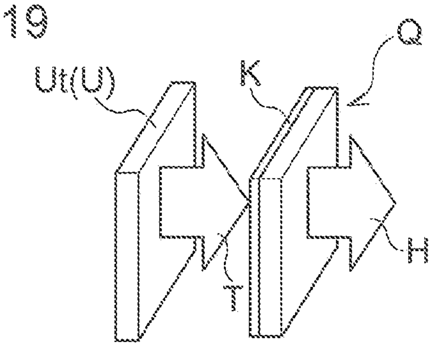
FIG. 19 is a perspective view showing relation between the heat-radiating light source and a high-temperature fluid source.

FIG. 19 shows a case in which the external heating portion U is configured as a fluid supply source Ut for supplying high-temperature fluid T; in this case, the substrates K of the heat-radiating light sources Q are disposed in opposition to the fluid supply source Ut.

[Modified Examples of Substrate Adhesive Layer]

The substrate adhesive layer S1 is constituted of titanium (Ti) as described above. However, depending on the kind of material forming the substrate K, its configuration needs to be modified slightly.

If the material forming the substrate K is sapphire or alumina ($Al_2O_3$), the substrate adhesive layer S1 will be constituted solely of titanium (Ti) as described above.

In case the material forming the substrate K is quartz ($SiO_2$), the substrate adhesive layer S1 can be constituted of titanium (Ti) alone or may be lamination of titanium (Ti) and alumina ($Al_2O_3$). Namely, the first platinum layer P1/titanium (Ti)/alumina ($Al_2O_3$) (30 nm)/substrate K may be laminated in this mentioned order.

In case the material forming the substrate K is any one of stainless steel (SUS), Kanthal, nichrome, aluminum, and silicon, the first platinum layer P1/titanium (Ti)/alumina ($Al_2O_3$) (30 nm)/substrate K may be laminated in this mentioned order. Or, the first platinum layer P1/titanium (Ti)/alumina ($Al_2O_3$) (30 nm)/hafnium oxide ($HfO_2$)/substrate K may be laminated in this mentioned order.

Namely, in case the substrate K comprises a metal or semiconductor, the first platinum layer P1/titanium (Ti) may react with such substrate K, thus being alloyed to become incapable of radiation control. Therefore, from the viewpoint of prevention of alloying, a layer of oxide should be interposed between the substrate K and titanium (Ti).

Other Embodiments

Next, other embodiments will be described one after another.

(1) In the foregoing embodiment, in view of the fact that even when the back face of the substrate K opposite to its face on which the heat-radiating layer N is to be laminated is oxidized, this will not adversely affect the heat-radiating layer N as long as the thickness of the substrate K is large, the back face of the substrate K opposite to its face on which the heat-radiating layer N is laminated is exposed. Alternatively, on this back face, an anti-oxidization film for suppressing oxidization may be laminated.

(2) In the foregoing embodiment, there were disclosed the case of the radiation control portion Na having one MIM lamination portion M and the case of the radiation control portion Na having two MIM lamination portions M. Alternatively, it is also possible to embody the invention with an arrangement of the radiation control portion Na having three or more MIM lamination portions M.

Incidentally, the arrangements or configurations disclosed in the foregoing embodiment (including the other embodiments) may be used in combination with the arrangements or configurations disclosed in the other embodiments, unless no contradiction results from such combination. Further, the embodiments disclosed in this disclosure are merely illustrative, and the present invention is not limited to these embodiments, but may be modified appropriately within a range not deviating from the object of the present invention.

DESCRIPTION OF SIGNS

K: substrate
N: heat-radiating layer
Na: radiation control portion
Nb: radiating transparent oxide layer
M: MIM lamination portion
P: platinum layer
R: resonating transparent oxide layer
S1: substrate adhesive layer
S2: platinum adhesive layer

The invention claimed is:

1. A heat-radiating light source comprising a heat-radiating layer and a substrate laminated thereon for heating the heat-radiating layer;

wherein in the heat-radiating layer, there are provided a radiation control portion and a radiating transparent oxide layer, the radiation control portion comprising a metal insulator metal lamination portion including a pair of platinum layers juxtaposed along a lamination direction of the heat-radiating layer and the substrate, and a resonating transparent oxide layer formed of a transparent oxide and disposed between the pair of platinum layers, the radiation control portion and the radiating transparent oxide layer laminated with the radiation control portion and the radiating transparent oxide layer disposed closer to the substrate in this order;

wherein the resonating transparent oxide layer has a thickness providing a resonance wavelength equal to or smaller than 4 μm; and the resonating transparent oxide layer is provided between each adjacent pair of three or more platinum layers juxtaposed along the lamination direction of the heat-radiating layer and the substrate so that the radiation control portion has a plurality of the metal insulator metal lamination portions.

2. The heat-radiating light source of claim 1, wherein between the substrate and the platinum layer adjacent the substrate in the radiation control portion, there is laminated a substrate adhesive layer.

3. The heat-radiating light source of claim 2, wherein between the platinum layer and the resonating transparent oxide layer in the metal insulator metal lamination portion and between the radiating transparent oxide layer and the platinum layer adjacent the radiating transparent oxide layer in the radiation control portion, respectively, there is laminated a platinum adhesive layer.

4. The heat-radiating light source of claim 3, wherein the substrate adhesive layer and the platinum adhesive layer are formed of titanium.

5. The heat-radiating light source of claim 3, wherein the transparent oxide forming the resonating transparent oxide layer and the radiating transparent oxide layer comprises aluminum oxide or titanium oxide.

6. The heat-radiating light source of claim 3, wherein the substrate is configured to be self-heating with supply of electric power thereto.

7. The heat-radiating light source of claim 3, wherein the substrate is configured to be heated by an external heating portion.

8. The heat-radiating light source of claim 2, wherein the transparent oxide forming the resonating transparent oxide layer and the radiating transparent oxide layer comprises aluminum oxide or titanium oxide.

9. The heat-radiating light source of claim 2, wherein the substrate is configured to be self-heating with supply of electric power thereto.

10. The heat-radiating light source of claim 2, wherein the substrate is configured to be heated by an external heating portion.

11. The heat-radiating light source of claim 1, wherein the transparent oxide forming the resonating transparent oxide layer and the radiating transparent oxide layer comprises aluminum oxide or titanium oxide.

12. The heat-radiating light source of claim 1, wherein the substrate is configured to be self-heating with supply of electric power thereto.

13. The heat-radiating light source of claim 1, wherein the substrate is configured to be heated by an external heating portion.

* * * * *